United States Patent
Hong et al.

(10) Patent No.: US 11,050,519 B2
(45) Date of Patent: Jun. 29, 2021

(54) METHODS, APPARATUS, SYSTEMS AND PROCEDURES FOR HYBRID AUTOMATIC REPEAT REQUESTS (HARQS) USING POLAR CODES

(71) Applicant: IDAC Holdings, Inc., Wilmington, DE (US)

(72) Inventors: Sungkwon Hong, Dongjak-gu (KR); Onur Sahin, London (GB)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/564,567

(22) Filed: Sep. 9, 2019

(65) Prior Publication Data

US 2020/0092048 A1 Mar. 19, 2020

Related U.S. Application Data

(60) Provisional application No. 62/731,407, filed on Sep. 14, 2018.

(51) Int. Cl.
| | |
|---|---|
| *H04L 1/18* | (2006.01) |
| *H04L 1/00* | (2006.01) |
| *H04L 5/00* | (2006.01) |

(52) U.S. Cl.
CPC .......... *H04L 1/1819* (2013.01); *H04L 1/0061* (2013.01); *H04L 1/1825* (2013.01); *H04L 5/0055* (2013.01)

(58) Field of Classification Search
CPC ... H04L 1/1819; H04L 1/1825; H04L 1/0061; H04L 5/0055
See application file for complete search history.

(56) References Cited

U.S. PATENT DOCUMENTS 10,224,966 B2 * 3/2019 Li ........................ H04L 1/0061
10,361,815 B2 * 7/2019 Shen ..................... H03M 13/13
(Continued)

FOREIGN PATENT DOCUMENTS

WO WO-2017176309 A1 * 10/2017 ........ H03M 13/6362

OTHER PUBLICATIONS

Kai Niu et al.,"CRC-Aided Decoding of Polar Codes", IEEE Communications Letters, vol. 16, No. 10, Oct. 2012, 4 pages.
(Continued)

*Primary Examiner* — Rasheed Gidado
(74) *Attorney, Agent, or Firm* — Eric Berkowitz

(57) ABSTRACT

Methods, apparatuses, and systems implemented by a transmitting node (TN), are provided. A representative method implemented by a TN may include generating a first set of polar coded bits (PCBs), sending the first set of PCBs or an interleaved copy of the first set of PCBs in a first transmission, and selecting one code generating operation (CGO) from a plurality of CGOs based on a number of shortened bits associated with the shortening operation. The method may also include storing in a circular buffer a second set of PCBs based on the first set of PCBs or a mother code block (MCB) in accordance with the selected CGO, on condition that the first transmission was not successful, outputting, from the circular buffer, a copy of a part of the second set of PCBs for transmission; and sending the copy of the second set of PCBs in a second transmission.

17 Claims, 19 Drawing Sheets

(56) References Cited

U.S. PATENT DOCUMENTS

| | | | |
|---|---|---|---|
| 10,374,753 B2* | 8/2019 | Shen | H04L 1/0057 |
| 10,425,111 B2* | 9/2019 | Wu | H04L 1/0057 |
| 10,432,234 B2* | 10/2019 | Wu | H03M 13/6362 |
| 10,484,130 B2* | 11/2019 | Zhang | H04L 1/0057 |
| 10,491,326 B2* | 11/2019 | Zhang | H04L 1/0043 |
| 10,587,290 B2* | 3/2020 | Hui | H04L 1/0013 |
| 10,742,350 B2* | 8/2020 | Jang | H04L 1/0068 |
| 10,917,195 B2* | 2/2021 | John Wilson | H03M 13/2906 |
| 2019/0058548 A1* | 2/2019 | Wu | H04L 1/0058 |
| 2019/0280829 A1* | 9/2019 | Wei | H03M 13/13 |
| 2020/0028615 A1* | 1/2020 | Jang | H03M 13/6362 |
| 2020/0259505 A1* | 8/2020 | Xu | H03M 13/618 |
| 2020/0304241 A1* | 9/2020 | Noh | H04L 1/00 |

OTHER PUBLICATIONS

Harish Vangala et al., "A Comparative Study of Polar Code Constructions for the AWGN Channel", rXiv:1501.02473v1 [cs.IT]; (available at https://arxiv.org/pdf/1501.02473.pdf), Jan. 11, 2015, 9 pages.

Chen, Kai et al, "A Hybrid ARQ Scheme Based on Polar Codes", IEEE Commun. Letters, vol. 17, No. 10, pp. 1996-1999, Oct. 2013.

Ido Tal et al., "How to Construct Polar Codes, IEEE Transactions on Information Theory"; vol. 59, No. 10, Oct. 2013, 21 pages.

Bin Li et al, "Capacity-Achieving Rateless Polar Codes", IEEE International Symposium on Information Theory (ISIT), Barcelona, 2016, pp. 46-50.

Ma, Liang et al, "An Incremental Redundancy HARQ Scheme for Polar Code", arXiv:1708.09679v1 [cs.IT] Aug. 31, 2017, 6 pages.

Erdal Arikan, "Systematic Polar Coding", IEEE Communications Letters, vol. 15, No. 8, Aug. 2011, 3 pages.

M. Mohammadi et al, "Simple Hybrid ARQ Schemes Based on Systematic Polar Codes for IoT Applications", IEEE communications Letters, vol. 21, No. 5, May 2017, 4 pages.

Huawei et al, "HARQ for Polar Codes", 3GPP Tdoc R1-1801469, 3GPP TSG RAN WG1 Meeting #92, Athens, Greece, Feb. 26-Mar. 2, 2018, 3 pages.

Zhang, Zhaoyang et al, "Progressive Bit-Flipping Decoding of Polar Codes Over Layered Critical Sets", arXiv:1712.03332v1 [cs.IT] Dec. 9, 2017, 7 pages.

Erdal Arikan, "Channel Polarization: A Method for Constructing Capacity-Achieving Codes for Symmetric Binary-Input Memoryless Channels", IEEE Transactions on Information Theory; vol. 55, No. 7., Jul. 2009, 23 pages.

Ido Tal et., "List Decoding of Polar Codes", IEEE Transactions on Information Theory, vol. 61, No. 5., May 2015, 14 pages.

"3rd Generation Partnership Project; Technical Specification Group Radio Access Network; NR; Multiplexing and channel coding (Release 15)," 3GPP TS 38.212 V15.0.0 (Dec. 2017), 82 pages.

Gabi Sarkis et al, "Fast Polar Decoders: Algorithm and Implementation", IEEE Journal on Selected Areas in Communications, vol. 32, No. 5, pp. 946-957, May 2014.

* cited by examiner

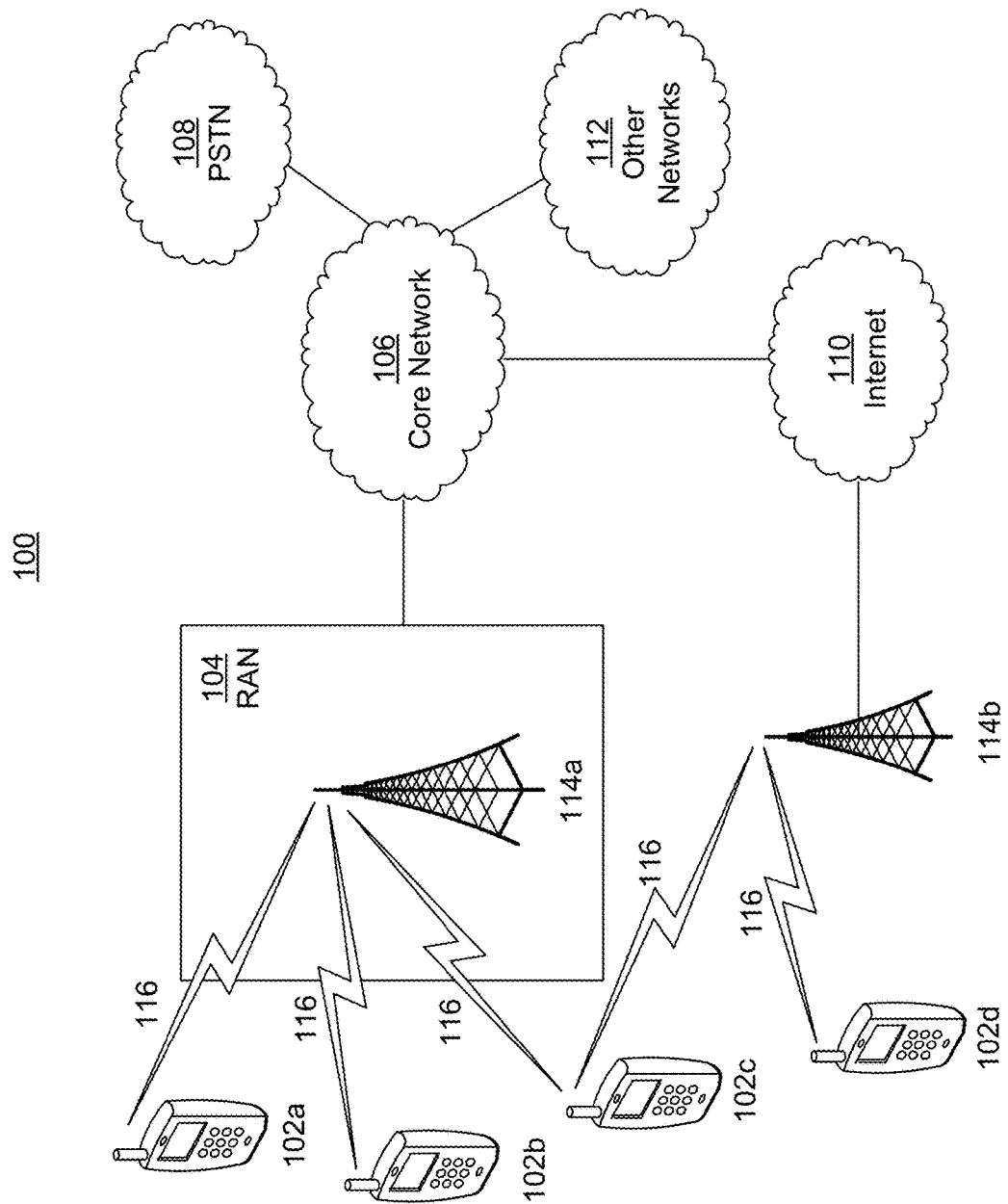

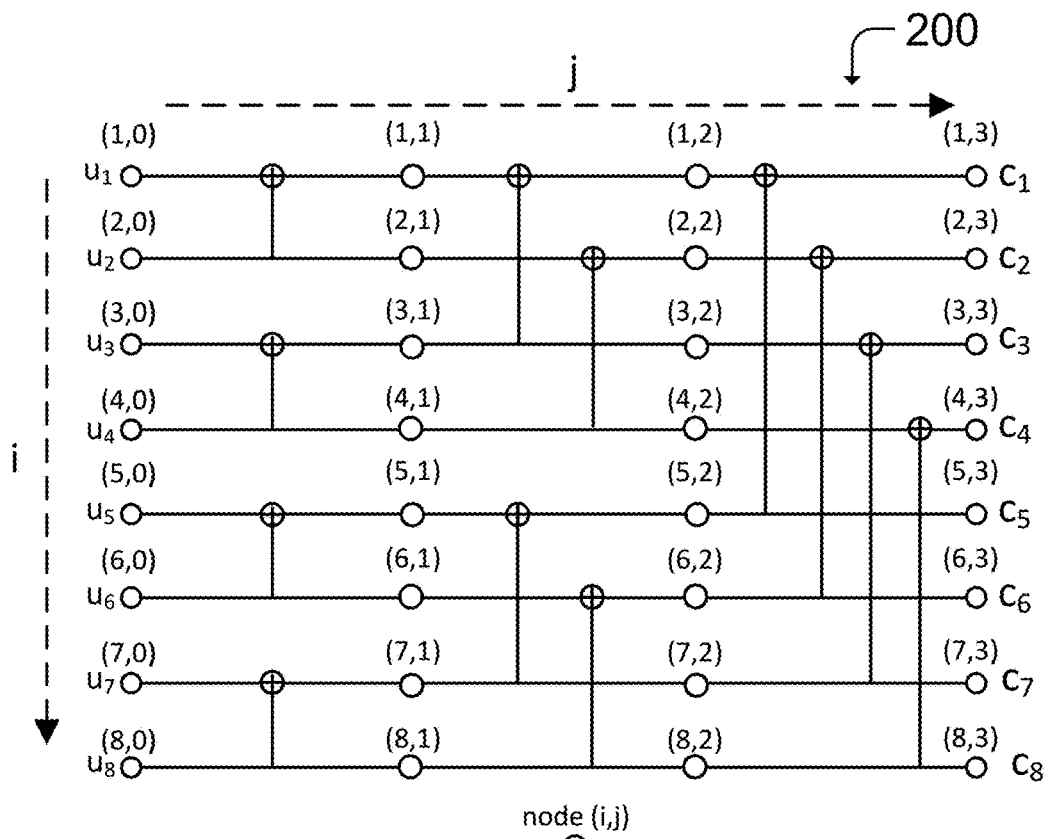
FIG. 2: Polar encoder with N=8
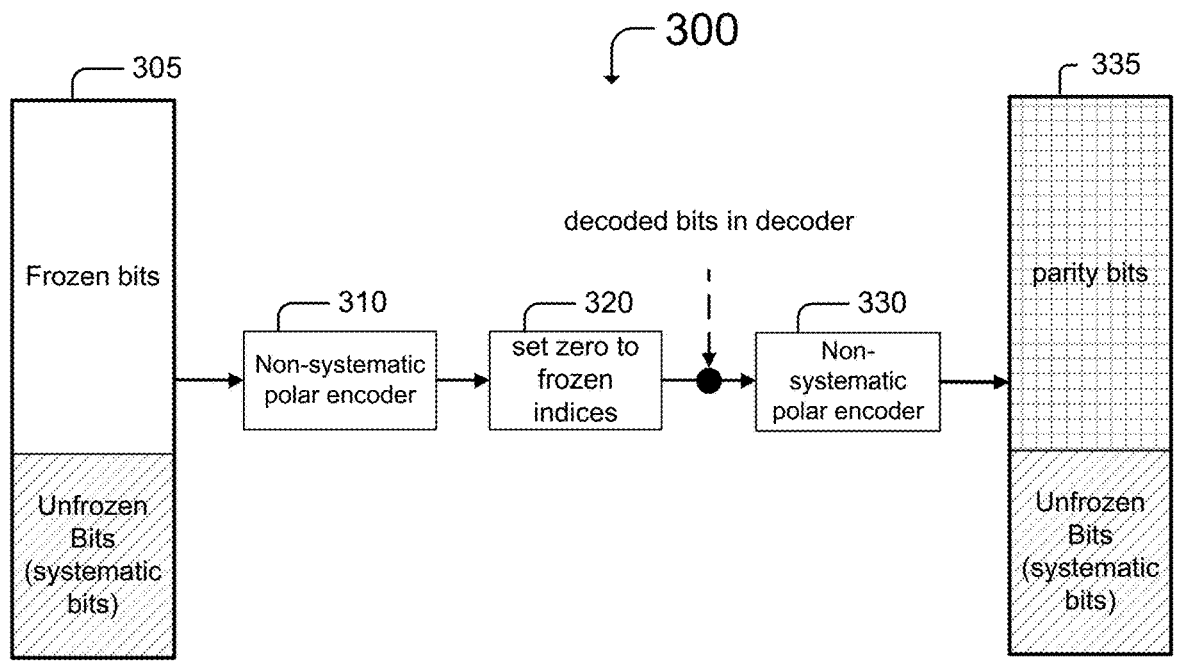
FIG 3: Systematic polar encoder

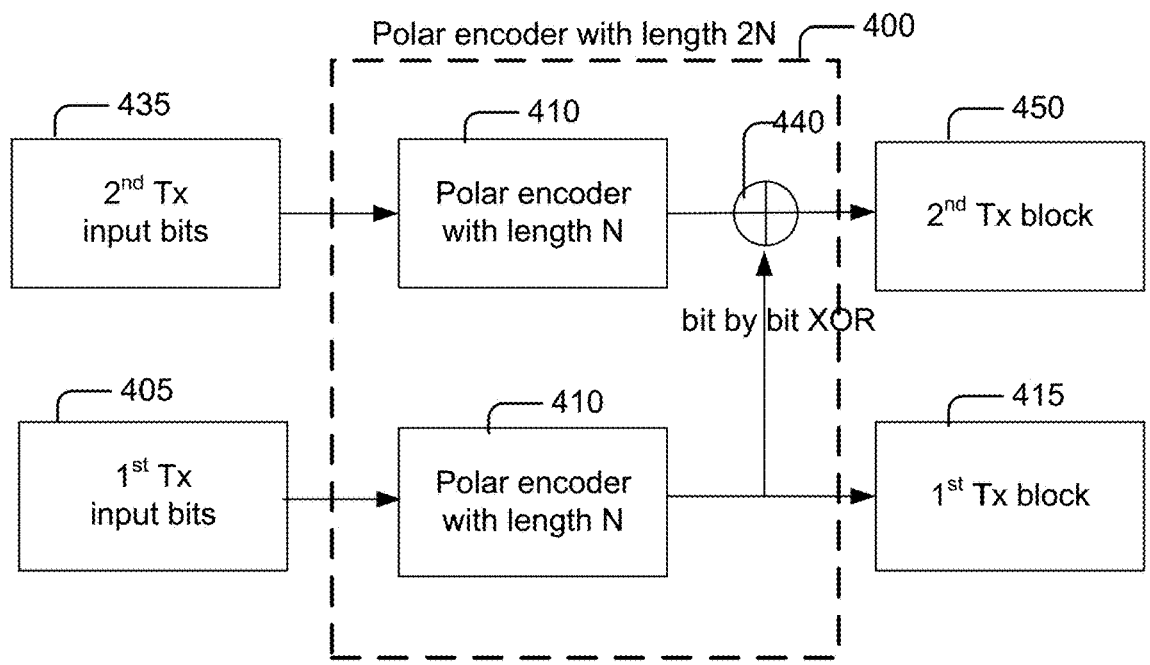
FIG. 4A
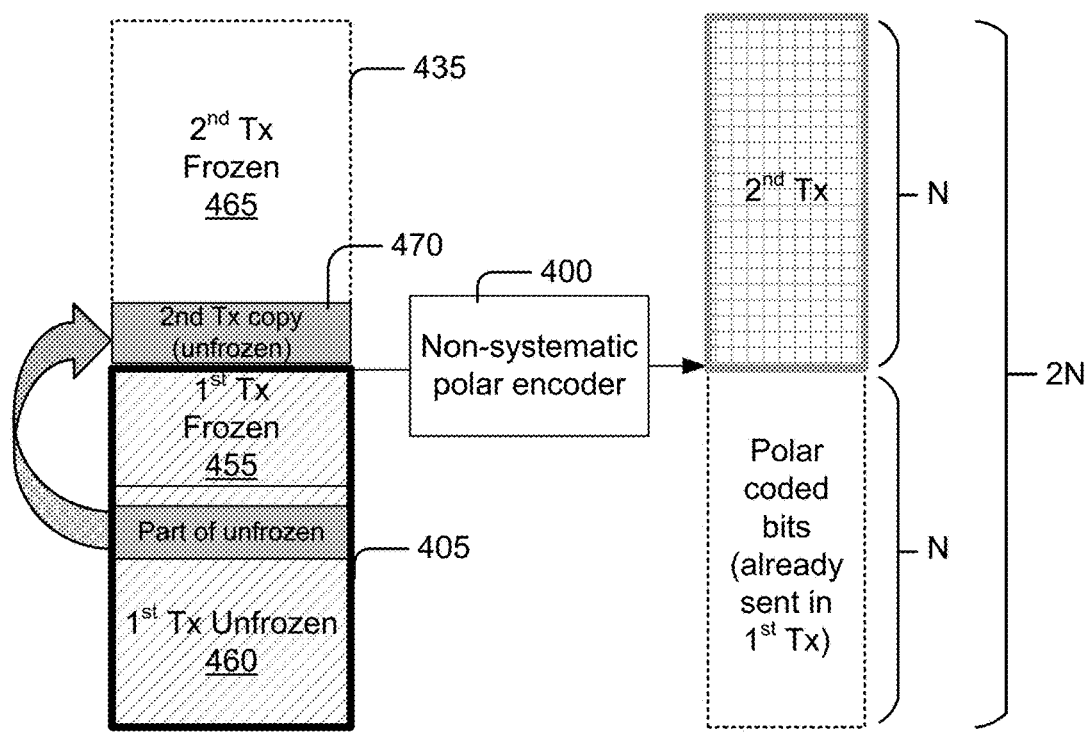
FIG. 4B: Second transmission in HARQ by kernel extension

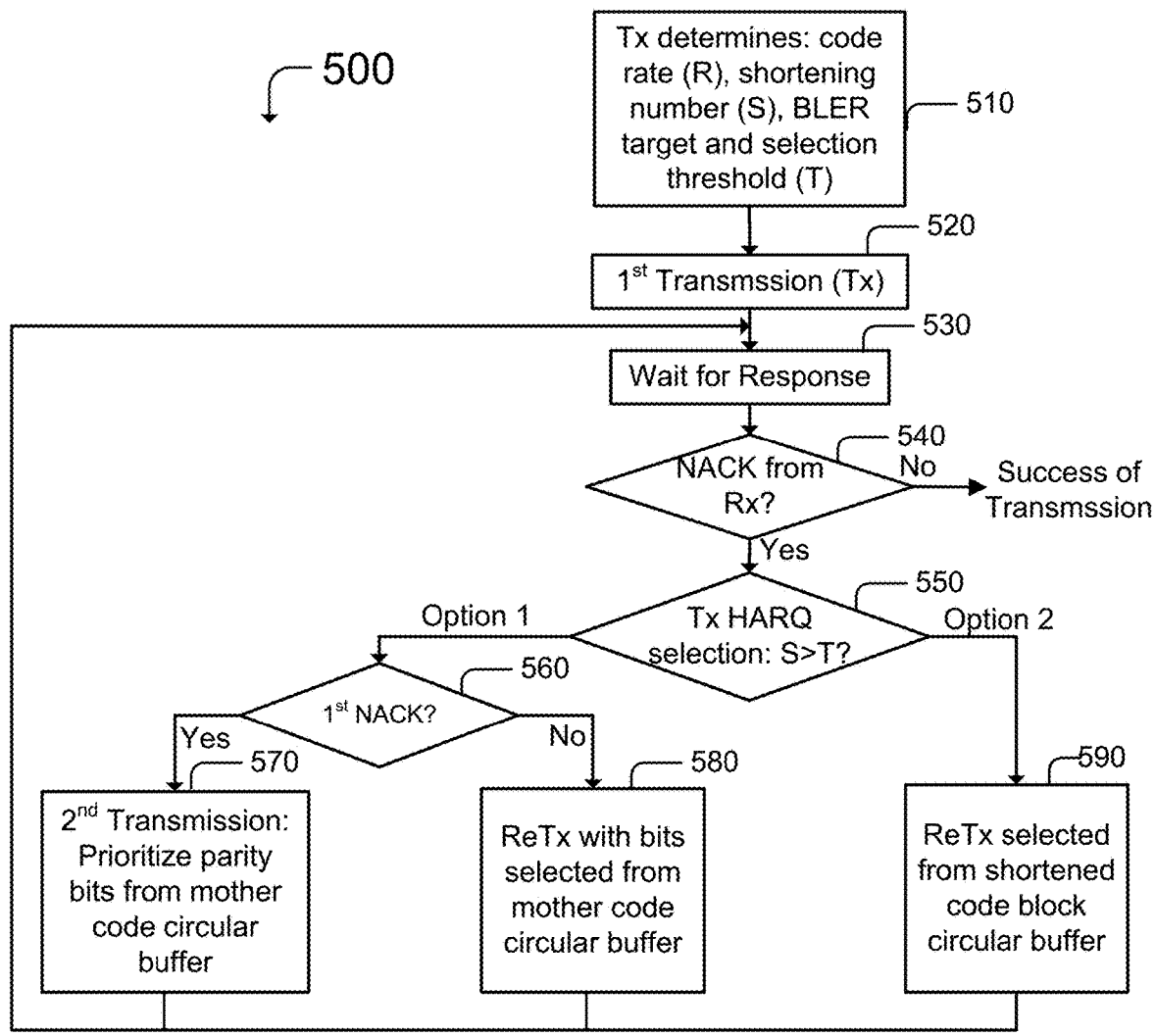
FIG. 5: Flowchart of a Retransmission Scheme between Transmitter and Receiver
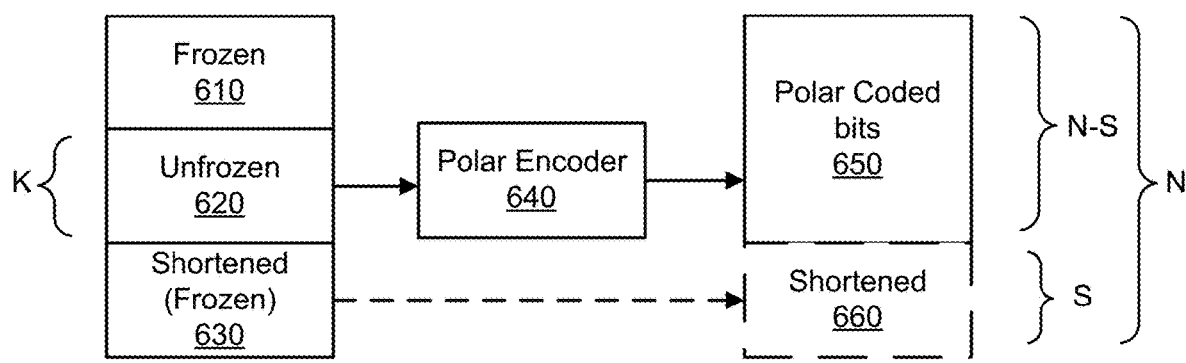
FIG. 6: 1st Transmission in the Scheme

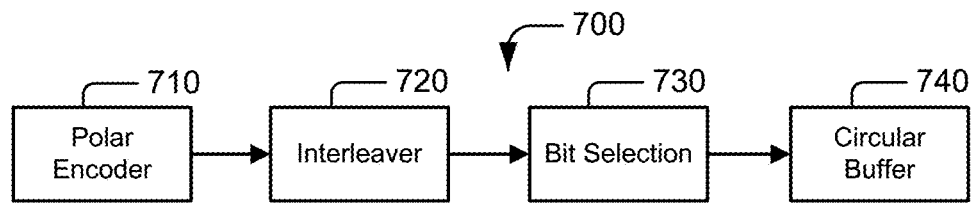
FIG. 7A: Transmitter Structure for HARQ
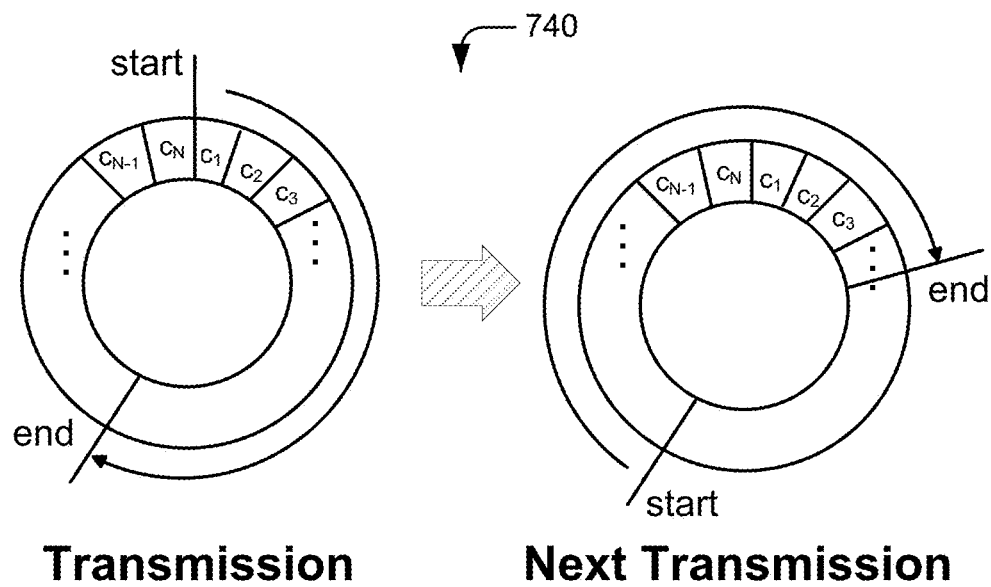
7B: HARQ using Circular Buffer
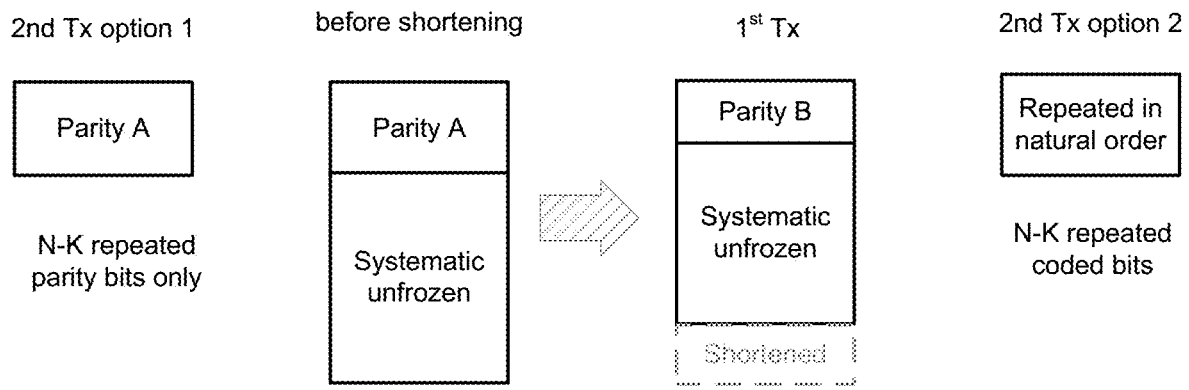
FIG. 8: Two options in the 2nd Tx

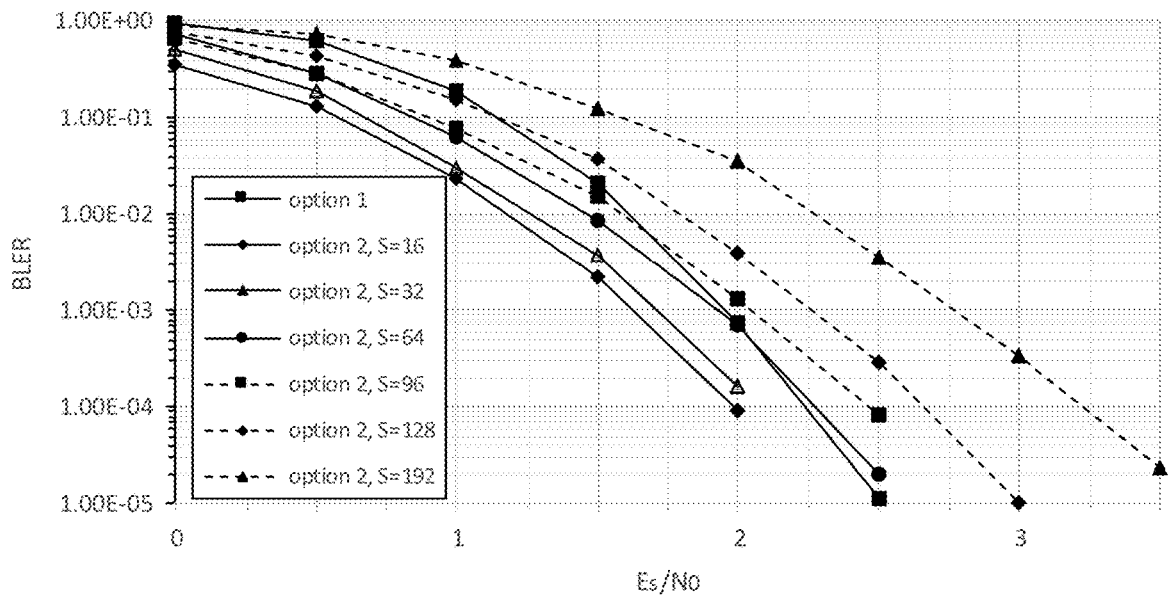
FIG. 9: BLER performance of an example for options 1 and 2 in the second transmission
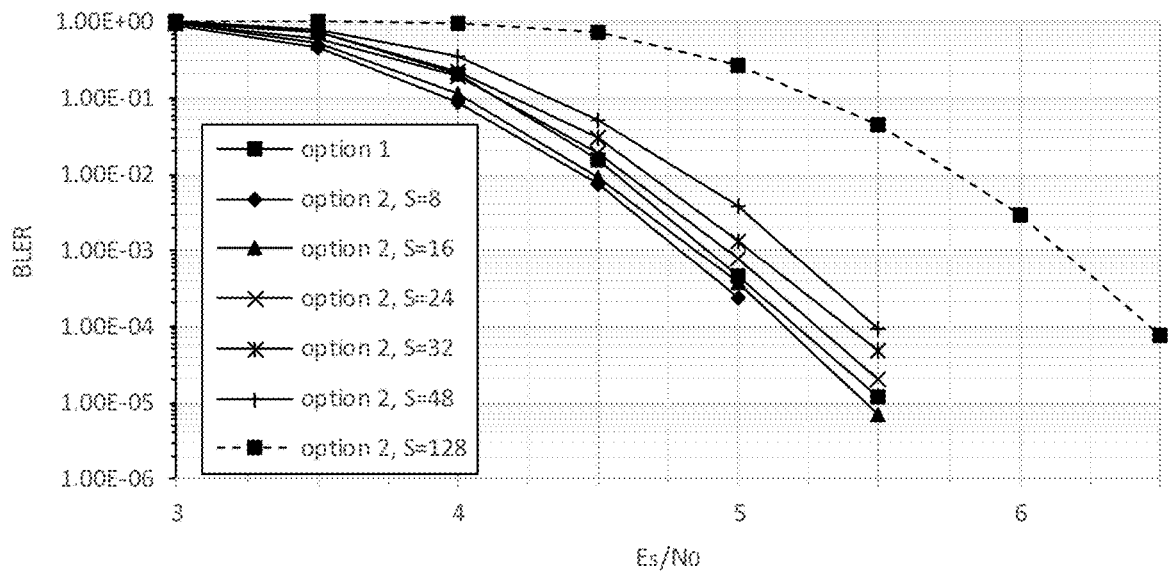
FIG. 10: BLER performance of high code rate example for options 1 and 2 in the second transmission

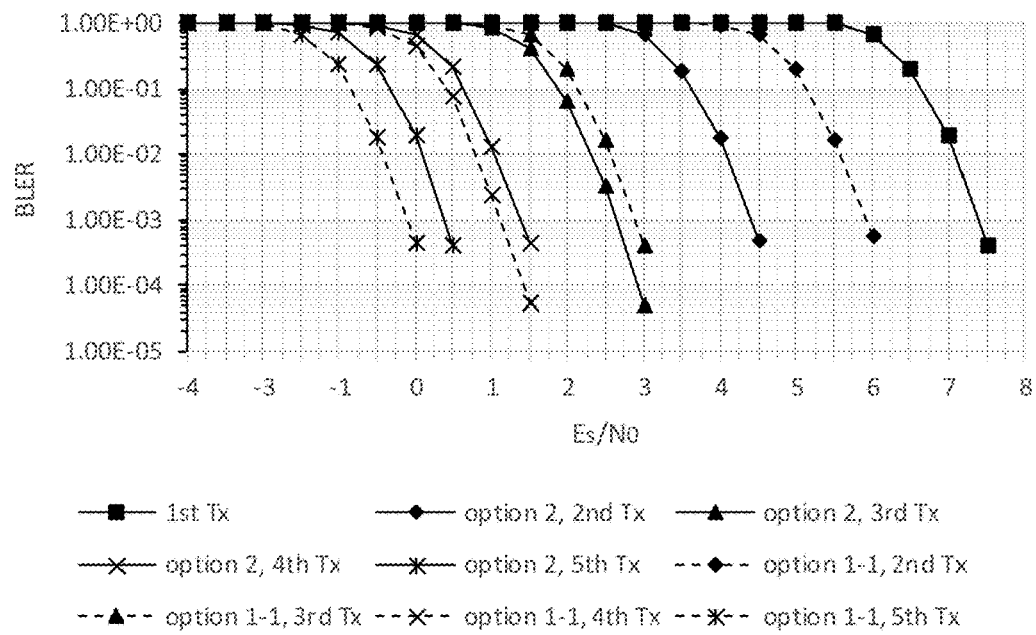
FIG. 11: BLER performance comparison between options 1-1 and 2
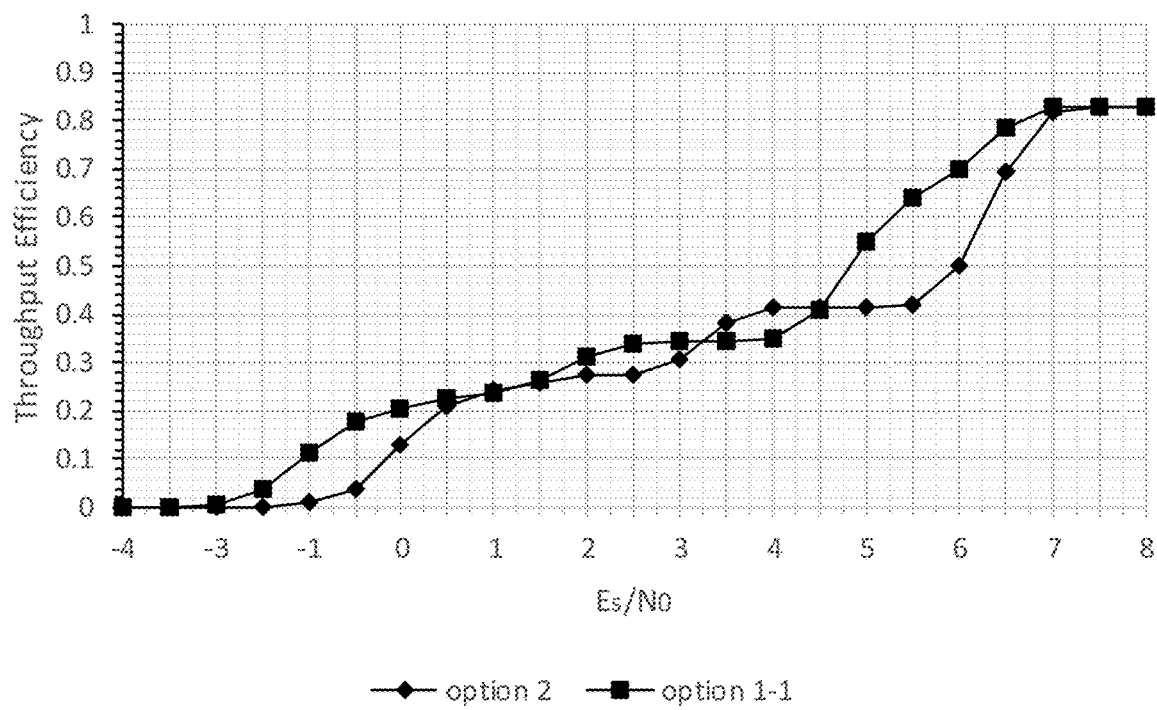
FIG. 12: Throughput efficiency comparison between options 1-1 and 2

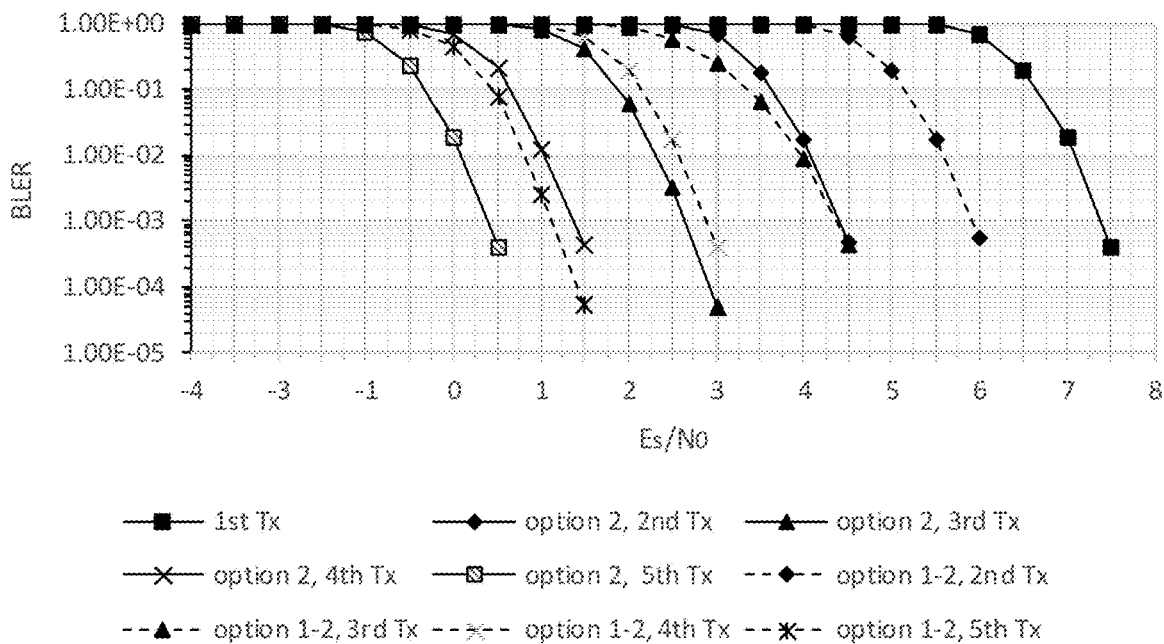
FIG. 13: BLER performance comparison between options 1-2 and 2
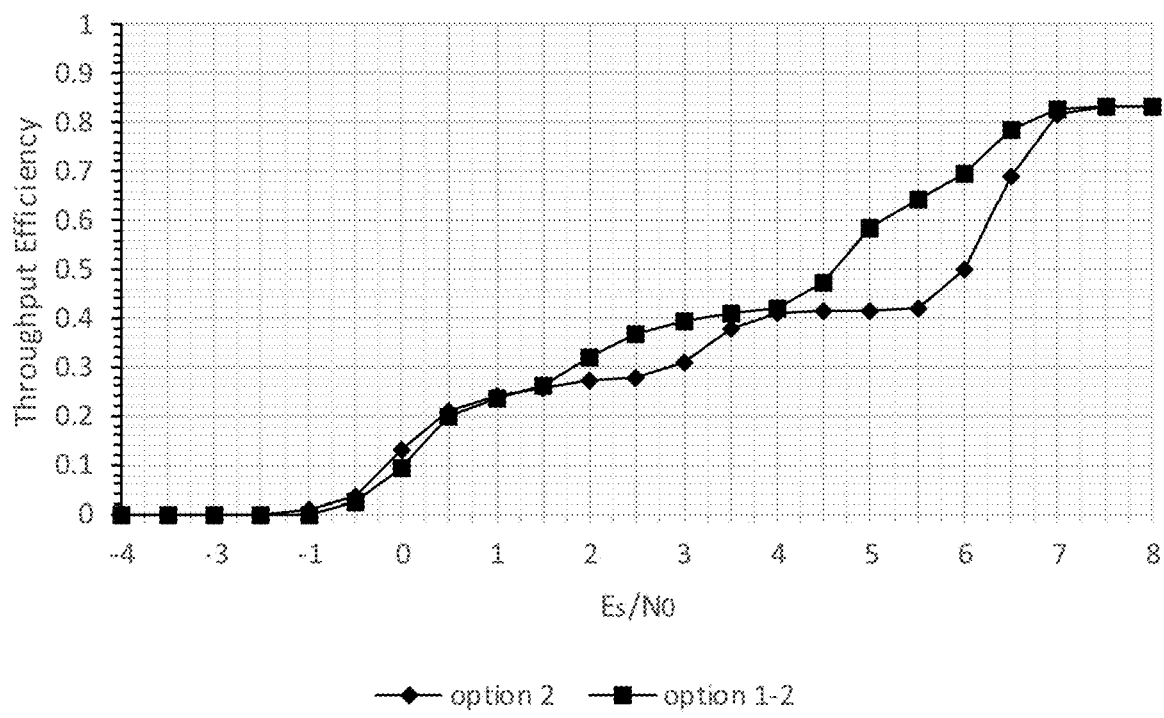
FIG. 14: Throughput efficiency comparison between options 1-2 and 2

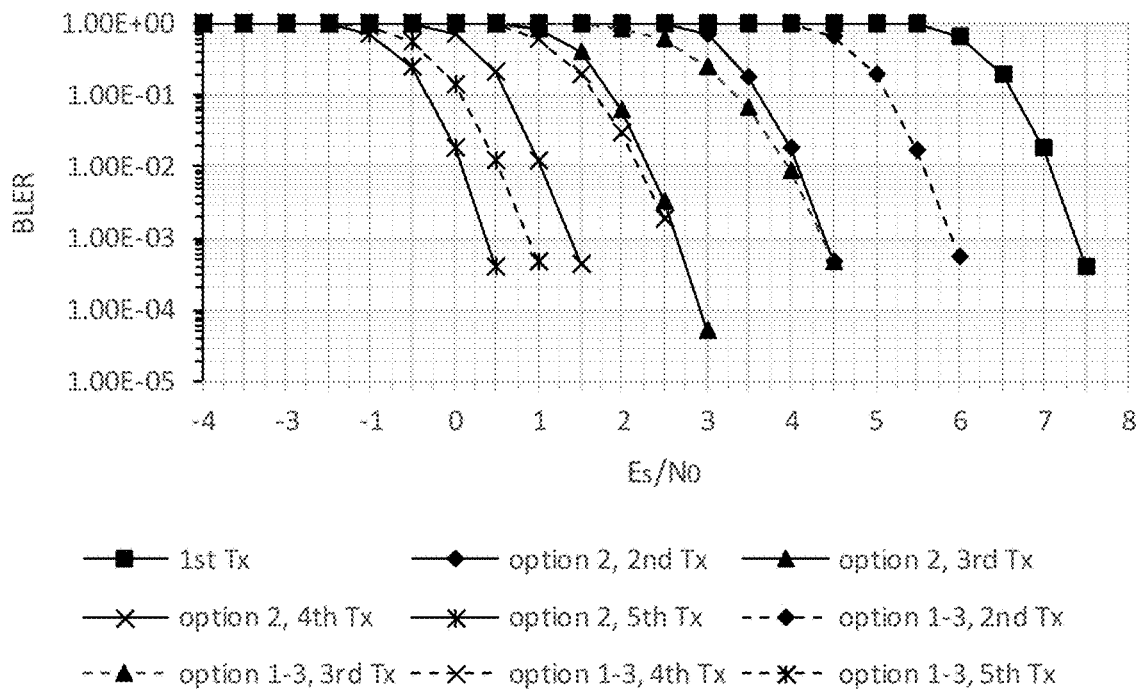
FIG. 15: BLER performance comparison between options 1-3 and 2
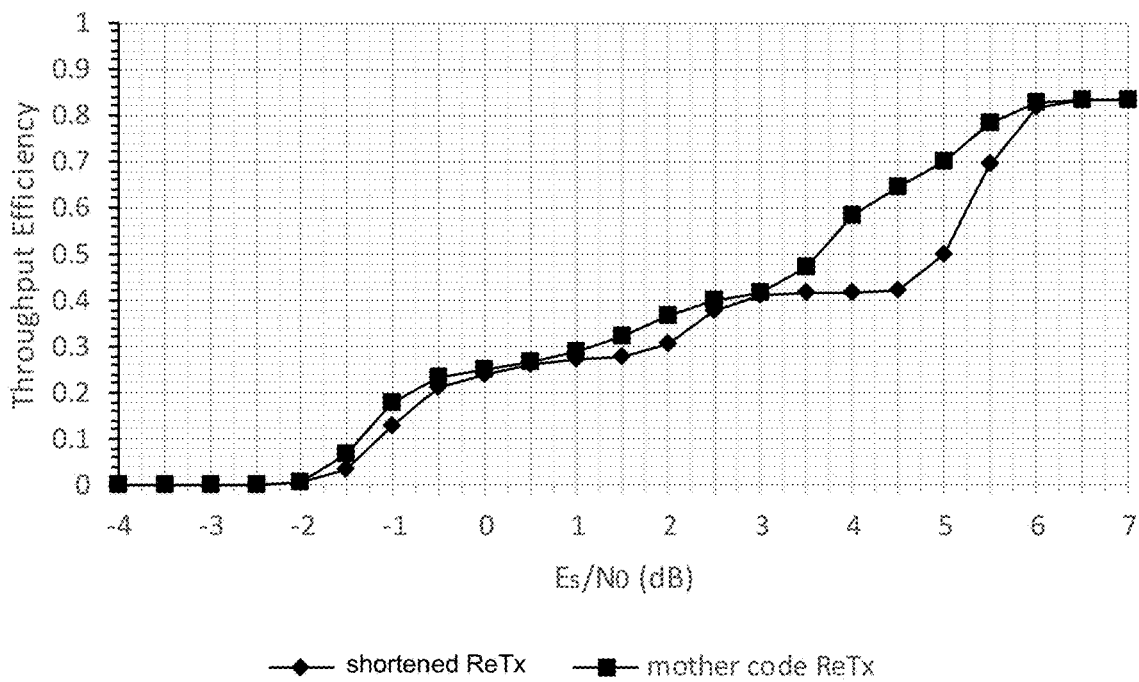
FIG. 16: Throughput efficiency comparison between options 1-3 and 2

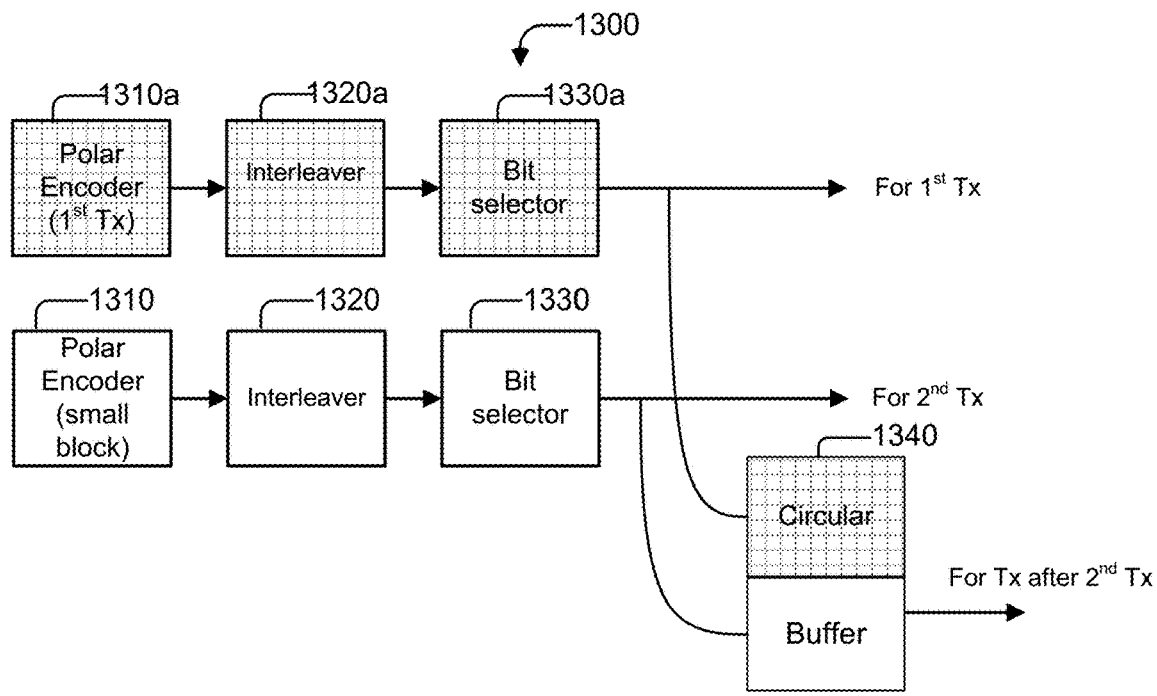
FIG. 17: Transmitter structure for HARQ
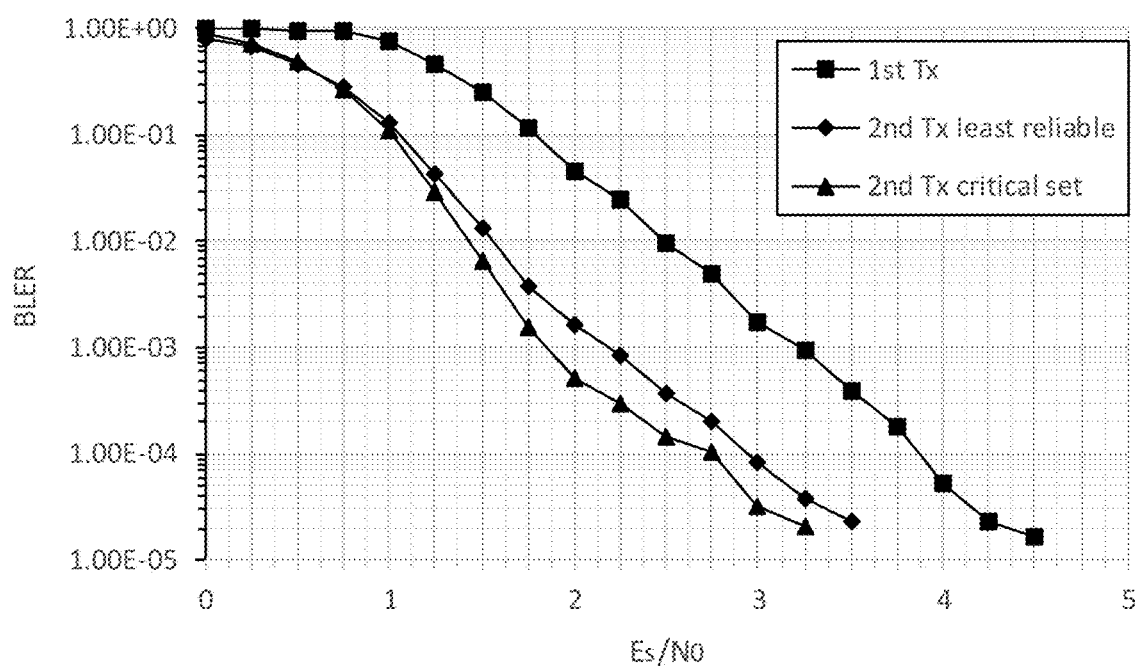
FIG. 18: BLER performance comparisons between schemes for 2$^{nd}$ Tx

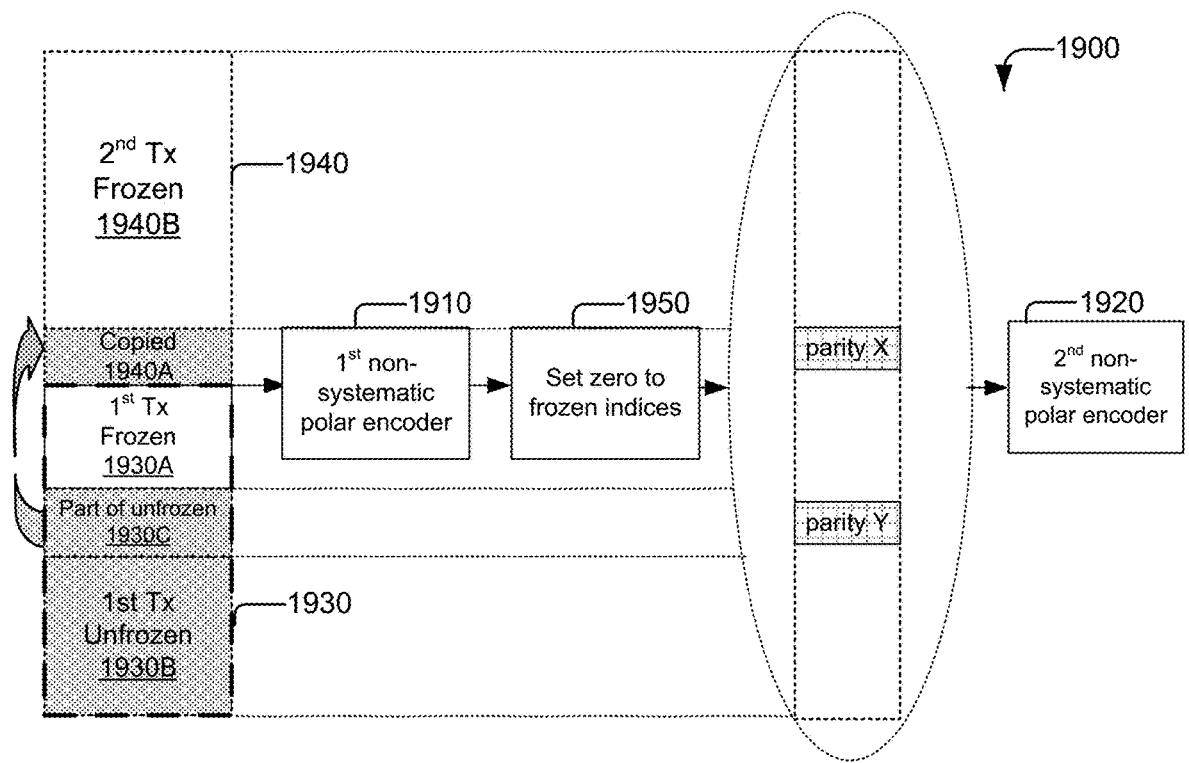
FIG. 19: HARQ 2nd transmission by Kernel extension for systematic polar code
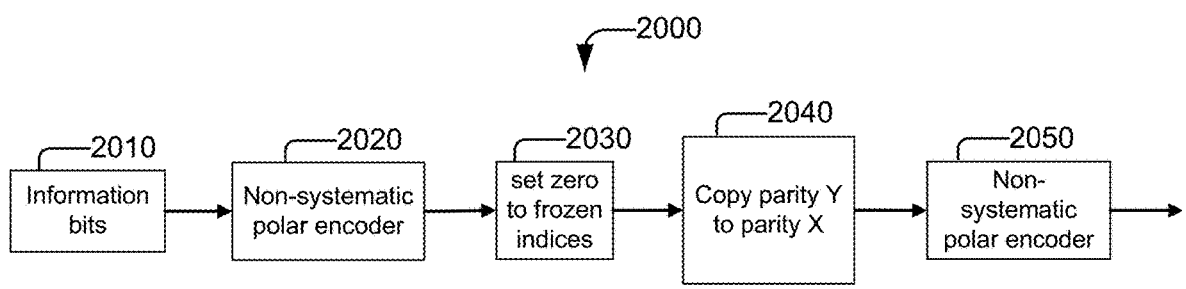
FIG. 20: Kernel extension scheme for systematic polar code

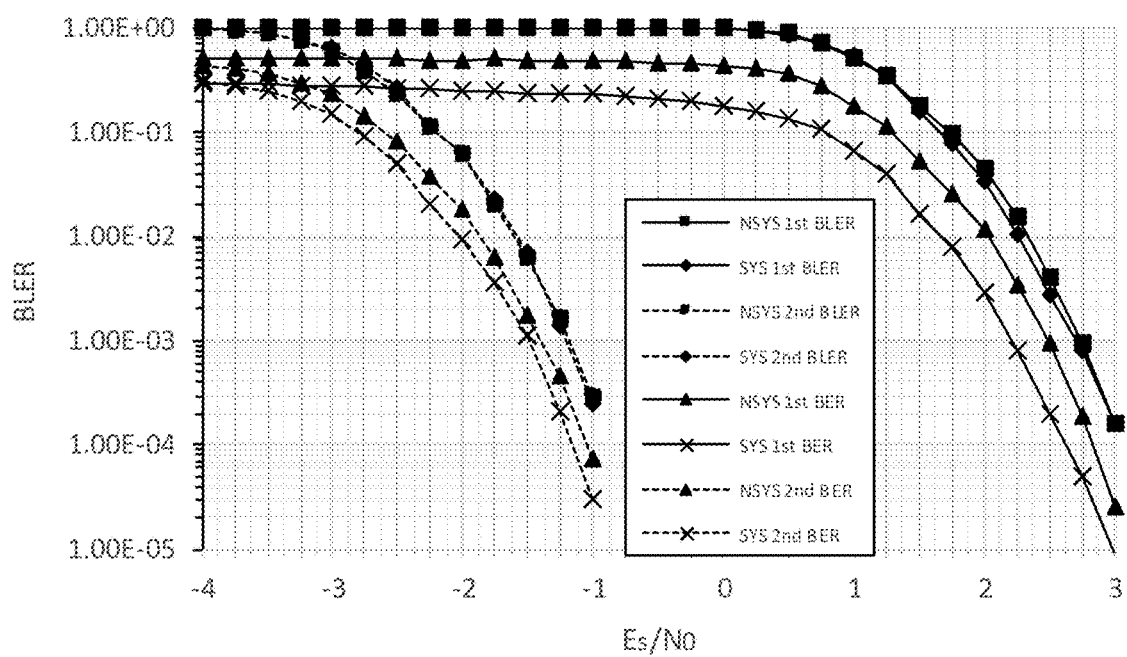
FIG. 21: performance comparison between BLERs for systematic and non-systematic coding

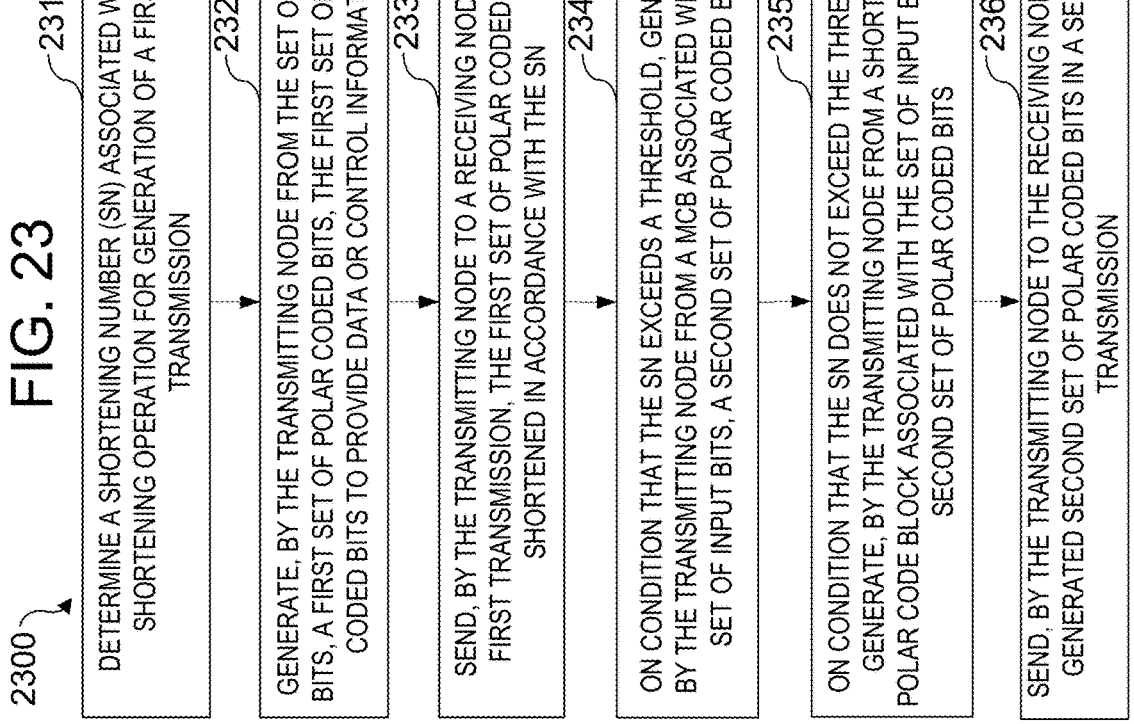
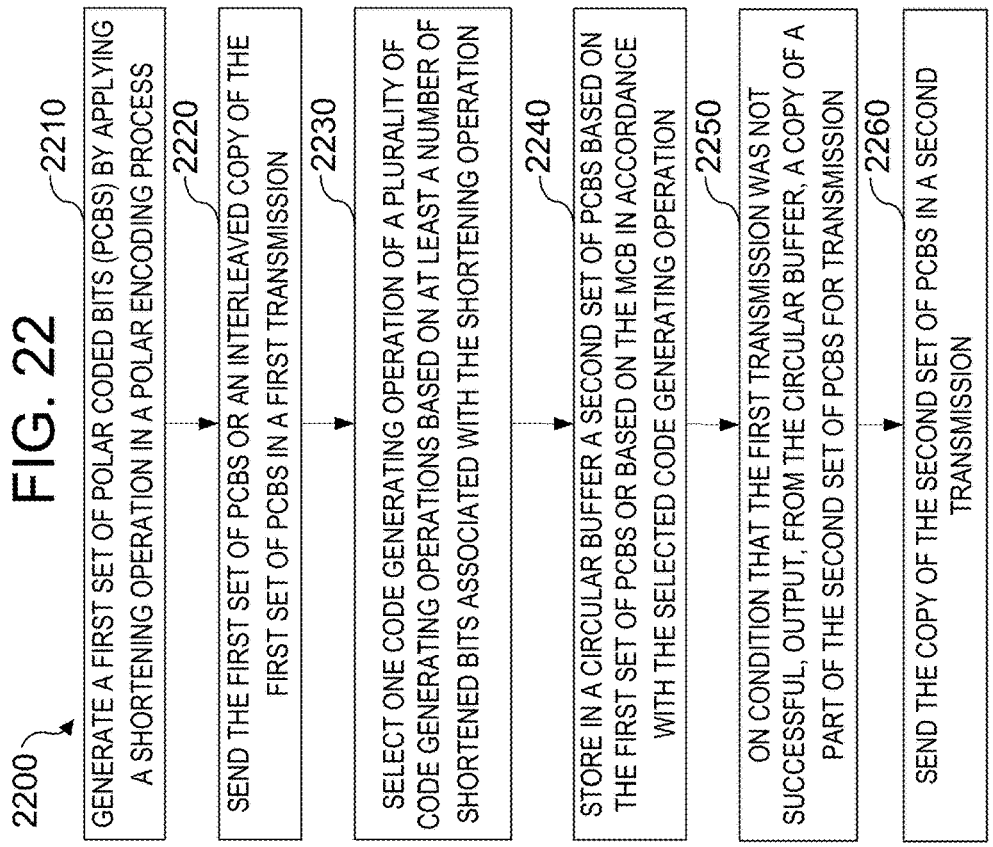

- 2410 — GENERATE, BY THE TRANSMITTING NODE FROM THE SET OF INPUT BITS, A FIRST SET OF POLAR CODED BITS, THE FIRST SET OF POLAR CODED BITS INCLUDING A SET OF PARITY BITS ASSOCIATED WITH THE FIRST SET OF CODED BITS
- 2420 — APPLY, BY THE TRANSMITTING NODE, A SHORTENING OPERATION IN A POLAR ENCODING PROCESS TO GENERATE A SHORTENED POLAR CODE BLOCK
- 2430 — SEND, BY THE TRANSMITTING NODE, THE SHORTENED POLAR CODE BLOCK IN A FIRST TRANSMISSION
- 2440 — STORE, BY THE TRANSMITTING NODE IN A CIRCULAR BUFFER, THE SHORTENED POLAR CODE BLOCK
- 2450 — GENERATE OR COPYING, BY THE TRANSMITTING NODE FROM THE SHORTENED POLAR CODE BLOCK STORED IN THE CIRCULAR BUFFER, A SECOND SET OF POLAR CODED BITS
- 2460 — SEND, BY THE TRANSMITTING NODE, THE SECOND SET OF POLAR CODED BITS IN A SECOND TRANSMISSION

- 2510 — GENERATE, BY THE TRANSMITTING NODE FROM THE SET OF INPUT BITS, A FIRST SET OF POLAR CODED BITS
- 2520 — SEND, BY THE TRANSMITTING NODE, THE FIRST SET OF POLAR CODED BITS IN A FIRST TRANSMISSION
- 2530 — SELECT ONE CODE GENERATING OPERATION OF A PLURALITY OF CODE GENERATING OPERATIONS BASED ON ANY OF: (1) A CODE RATE, (2) A TARGET ERROR RATE OR (3) A NUMBER OF SHORTENED BITS ASSOCIATED WITH THE FIRST TRANSMISSION
- 2540 — STORE, BY THE TRANSMITTING NODE IN A CIRCULAR BUFFER, A SECOND SET OF POLAR CODED BITS IN ACCORDANCE WITH THE SELECTED CODE GENERATING OPERATION
- 2550 — ON CONDITION THAT THE FIRST TRANSMISSION WAS NOT SUCCESSFUL, OUTPUT, FROM THE CIRCULAR BUFFER, A COPY OF THE SECOND SET OF POLAR CODED BITS OR AN INTERLEAVED COPY OF THE SECOND SET OF POLAR CODED BITS FOR TRANSMISSION
- 2560 — SEND, BY THE TRANSMITTING NODE, THE COPY OR THE INTERLEAVED COPY OF THE SECOND SET OF POLAR CODED BITS IN A SECOND TRANSMISSION

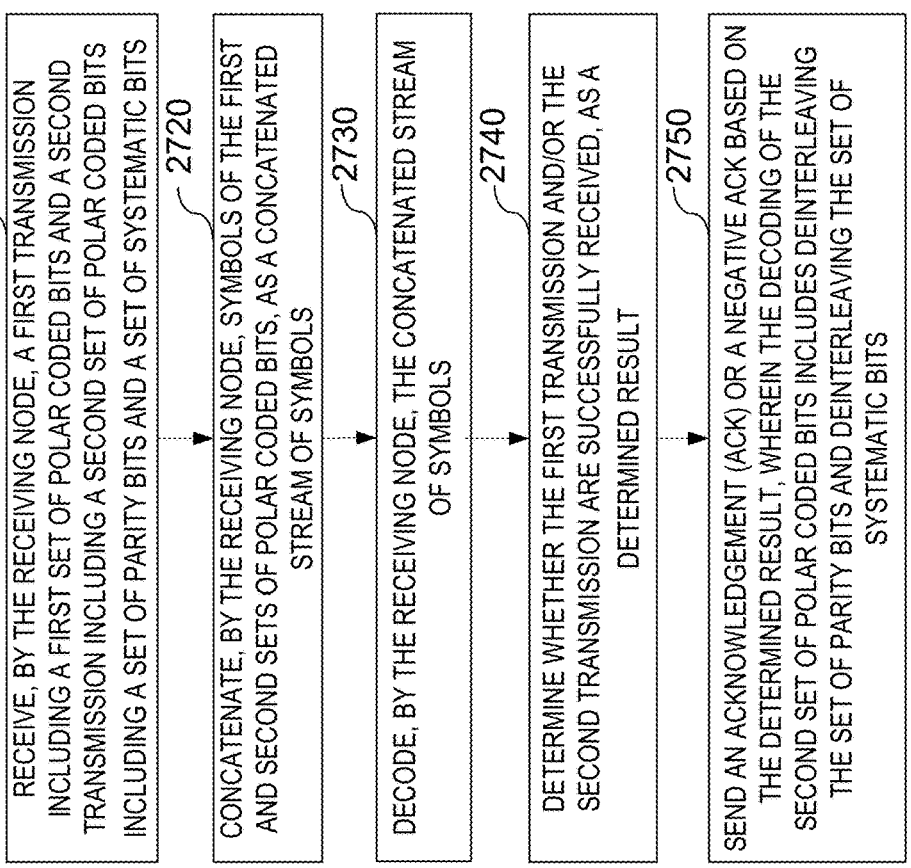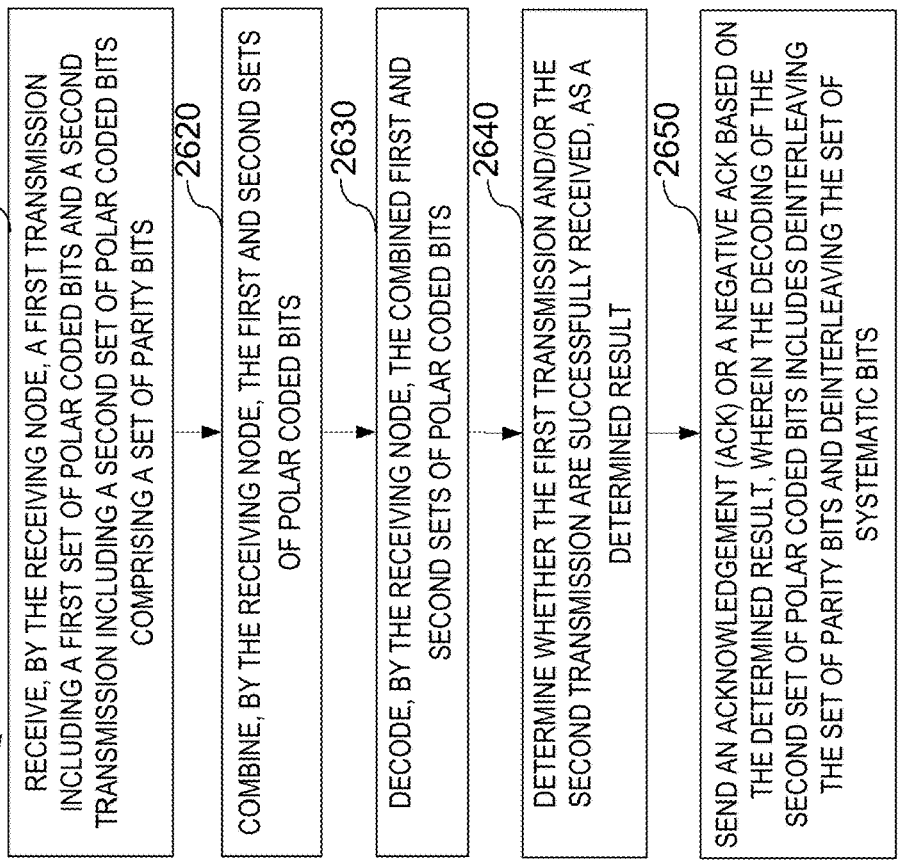

METHODS, APPARATUS, SYSTEMS AND PROCEDURES FOR HYBRID AUTOMATIC REPEAT REQUESTS (HARQS) USING POLAR CODES

CROSS REFERENCE TO RELATED APPLICATIONS

This application claims priority from U.S. Provisional Application No. 62/731,407, filed Sep. 14, 2018, the contents of which are incorporated herein by reference.

FIELD

The field of the disclosure relates to communications and, more particularly, to methods, apparatus, and systems for communications for HARQs using polar codes.

BRIEF DESCRIPTION OF THE DRAWINGS

A more detailed understanding may be had from the detailed description below, given by way of example in conjunction with drawings appended hereto. Figures in description, are examples. As such, the figures and the detailed description are not to be considered limiting, and other equally effective examples are possible and likely. Furthermore, like reference numerals in the figures indicate like elements, and wherein:

FIG. 10 is a system diagram illustrating an example radio access network (RAN) and an example core network (CN) that may be used within the communications system illustrated in FIG. 1A according to an embodiment;

FIG. 2 is block diagram illustrating a representative polar encoder (e.g., for N=8);

FIG. 3 is a diagram illustrating a representative systematic polar encoder;

FIG. 4A is a diagram illustrating a representative polar encoder using an Incremental Redundancy (IR) HARQ scheme (e.g., with one retransmission);

FIG. 4B is a diagram illustrating a representative Kernel Extension (KE) for a second transmission (and/or retransmission) using the representative polar encoder of FIG. 4A;

FIGS. 5 and 6 are diagrams illustrating a representative HARQ process;

FIGS. 7A and 7B are diagrams illustrating the transmitter structure for HARQ operations including a circular buffer;

FIG. 8 is a diagram illustrating representative options (e.g., Option 1 and Option 2) in the second transmission;

FIG. 9 is a graph illustrating example Block Error Rate (BLER) performances for Options 1 and 2 in the second transmission using various shortening levels (e.g., S=16, 32, 64, 96, 128, or 192);

FIG. 10 is a graph illustrating example BLER performances for high code rates for Options 1 and 2 in the second transmission using various shortening levels (e.g., S=8, 16, 24, 32, 48 or 128);

FIG. 11 is a graph illustrating BLER performances for Options 1-1 and 2 in various transmission (e.g., $1^{st}$ transmission through $5^{th}$ transmission);

FIG. 12 is a graph illustrating a throughput efficiency comparison between Option 1-1 and 2;

FIG. 13 is a graph illustrating representative BLER comparison between Option 1-2 and Option 2;

FIG. 14 is a graph illustrating a throughput efficiency comparison between Option 1-2 and Option 2;

FIG. 15 is a graph illustrating BLER performance comparisons between Option 1-3 and Option 2;

FIG. 16 is a graph illustrating a throughput efficiency comparison between Option 1-3 and Option 2;

FIG. 17 is a diagram illustrating a representative transmitter structure for HARQ operations;

FIG. 18 is a graph illustrating BLER performance comparisons between schemes for a $2^{nd}$ Transmission (Tx);

FIG. 19 is a diagram illustrating a HARQ $2^{nd}$ transmission by KE for a systematic polar code;

FIG. 20 is a diagram illustrating a KE scheme for systematic polar codes;

FIG. 21 is a graph illustrating performance comparisons between BLERs for systematic and non-systematic polar coding;

FIG. 22 is a flowchart illustrating a representative procedure implemented by a Transmitting Node (TN);

FIG. 23 is a flowchart illustrating another representative procedure implemented by a TN;

FIG. 24 is a flowchart illustrating a further representative procedure implemented by a TN;

FIG. 25 is a flowchart illustrating an additional representative procedure implemented by a TN;

FIG. 26 is a flowchart illustrating a representative procedure implemented by a Receiving Node (RN);

FIG. 27 is a flowchart illustrating another representative procedure implemented by a RN;

DETAILED DESCRIPTION

Figure 1B:
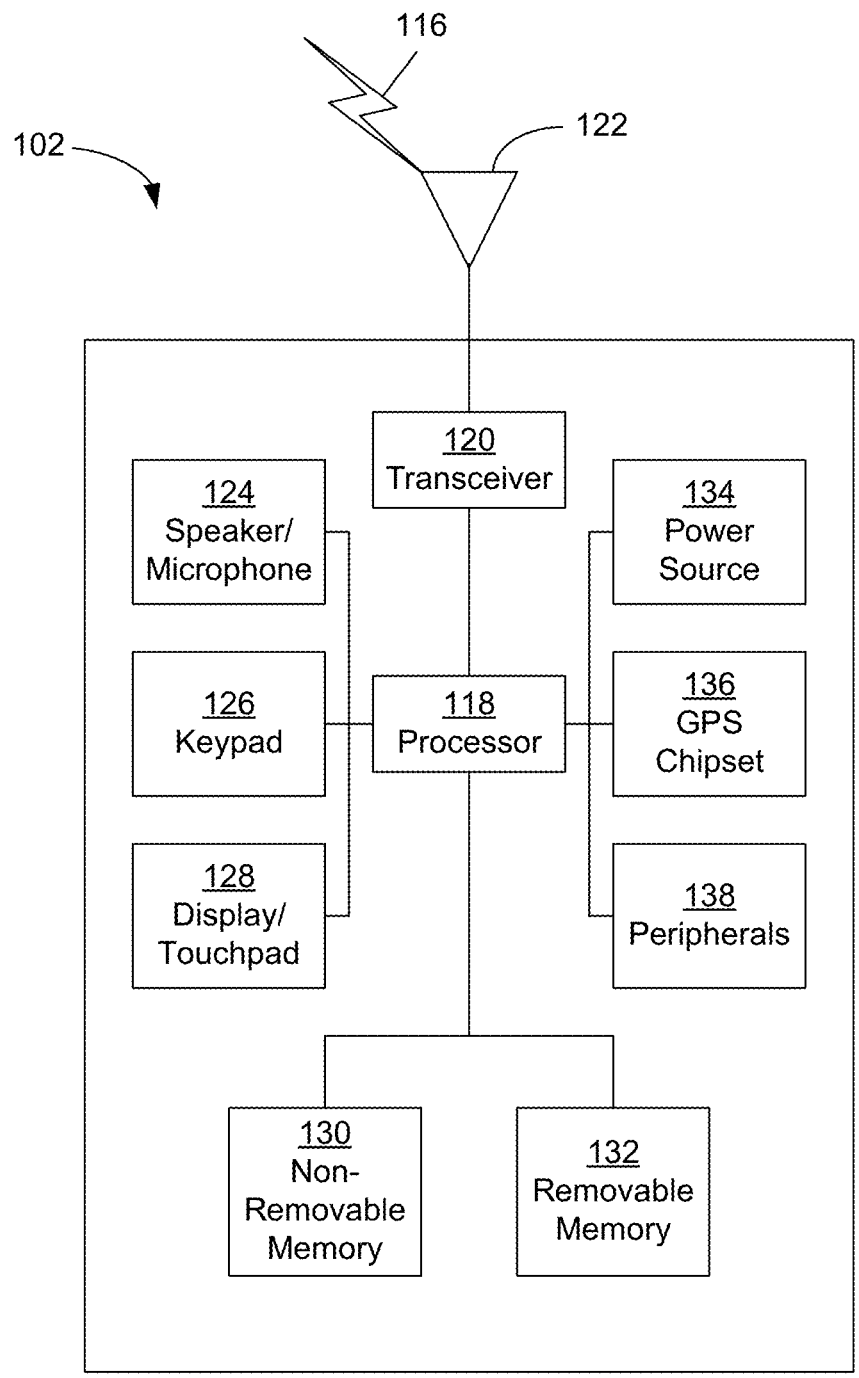
FIG. 1B is a system diagram illustrating an example wireless transmit/receive unit (WTRU) that may be used within the communications system illustrated in FIG. 1A according to an embodiment.
Figure 1C:
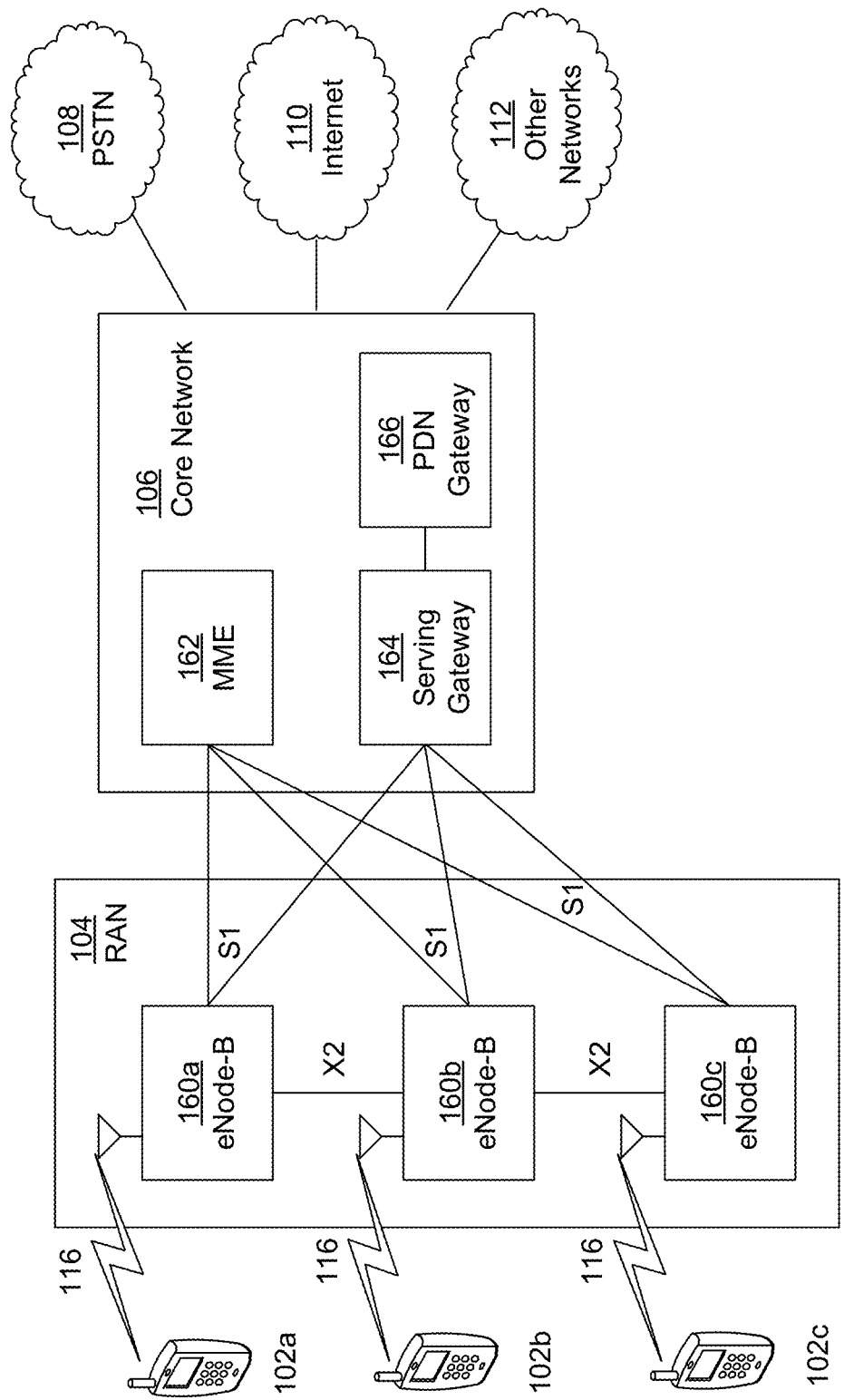
FIG. 1A is a system diagram illustrating an example communications system in which one or more disclosed embodiments may be implemented.
FIG. 1D is a system diagram illustrating a further example RAN and a further example CN that may be used within the communications system illustrated in FIG. 1A according to an embodiment.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements.

Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNode B and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 10, the eNode Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
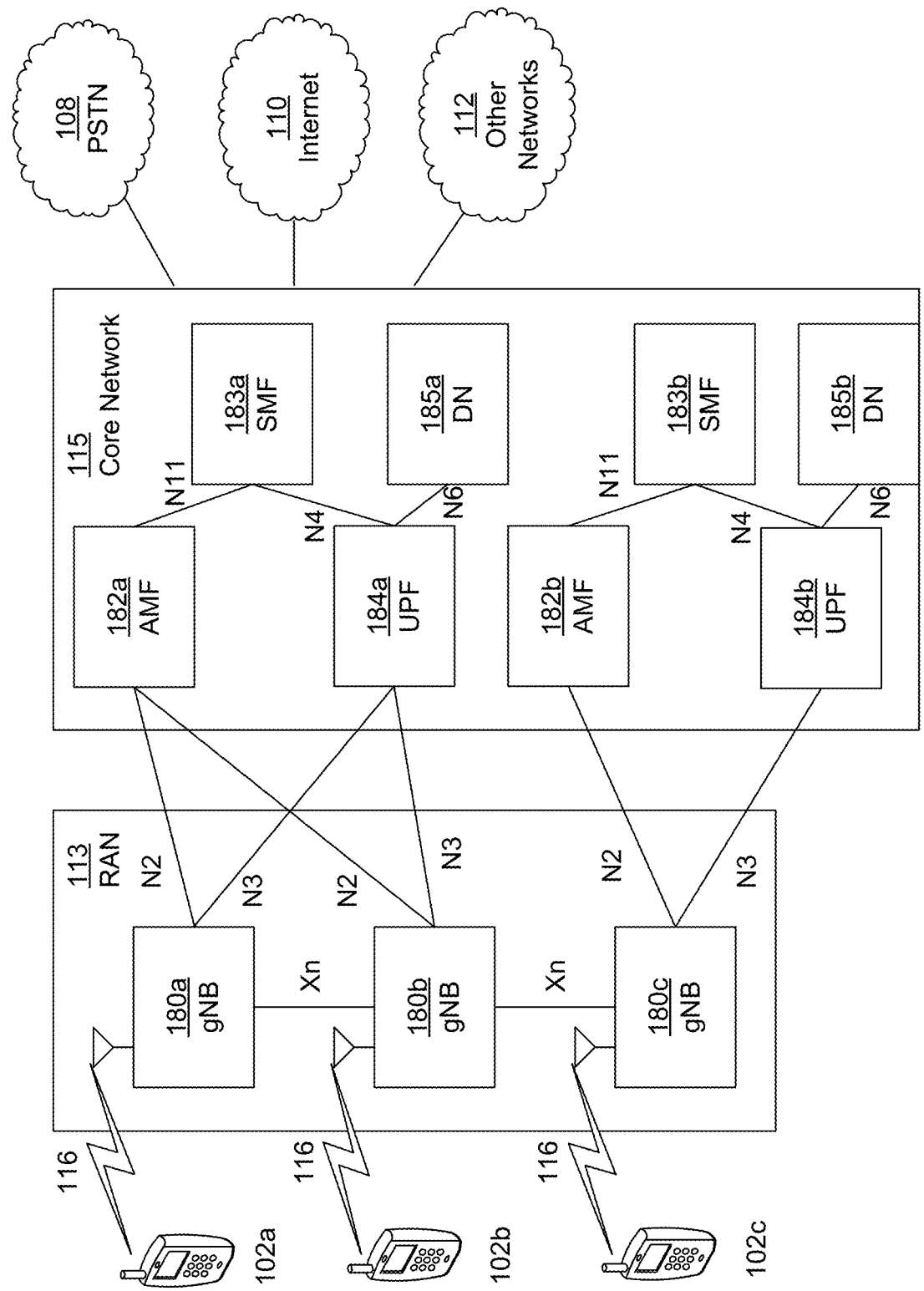

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode Bs 160a, 160b, 160c. For example, WTRUs 102a, 102b, 102c may implement DC principles to communicate with one or more gNBs 180a, 180b, 180c and one or more eNode Bs 160a, 160b, 160c substantially simultaneously. In the non-standalone configuration, eNode Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode B 160a-c, MME 162, SGW 164, PGW 166, gNB 180a, 180b, 180c, AMF 182a, 182b, UPF 184a, 184b, SMF 183a, 183b, DN 185a, 185b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In certain representative embodiments, method, systems and apparatus may be implemented using polar coding with any of: (1) HARQ, (2) EPIC, (3) Ultra-high speed communications (e.g., >100 Gbps), and/or (4) mmW/TeraHz communication, among others.

In certain representative embodiments, in the event of a retransmission, the transmitting end may adaptively configure its encoding and transmission scheme based on one of: (1) the mother code block (MCB) without shortening (e.g., prior to a shortening operation) being saved/stored in a buffer after interleaving and the retransmitted bits being selected in a circular manner from the buffer (e.g., the parity bits may be prioritized and all (e.g., a full set of) parity bits may be transmitted in the second transmission), and/or (2) the code block with shortening being saved/stored in a circular buffer after interleaving and bit selection and the retransmitted bits being selected in a circular manner from the buffer. The adaptive selection/configuration procedure may depend on one or more parameters such as (1) a code rate, (2) a target error rate and/or (3) a number of shortened bits in the first transmission of the systematic codes in a HARQ process.

Representative Polar Codes

Polar codes are channel codes analytically proven to be capacity achieving. Polar codes may show comparable performance to conventional Low-Density Parity-Check (LDPC) codes or conventional turbo codes with low or no error floor, for example, when aided by the embedded Cyclic Redundancy Check (CRC), for example for small to medium block lengths. Polar codes with successive cancellation decoding may require relatively low encoding and decoding complexities. The decoding complexity may increase in proportion to a list-size, for example when the CRC-aided list decoding and/or the block-length of the codeword are implemented. The complexity increase can become an issue (e.g., a central issue) for example in medium to large block-lengths, and may limit the adoption of polar codes for high throughput (e.g., above a threshold level throughput) regime including for example 5G NR enhanced Mobile Broadband (eMBB) data rates, for example of ~20 Gbps and above. For example, due to the performance (e.g., the superior performance) of Polar codes in small block lengths, a polar code is adopted as a channel coding scheme for the 3GPP NR standard to be used for control channel Forward Error Correction (FEC) operations.

Polar code encoding may be defined as set forth in Equation (1) as follows:

$$c_1^N = u_1^N G_N \quad (1)$$

The codeword vector of the polar code $c_1^N$ may be generated by a product of the input vector $u_1^N$ and the generator matrix $G_N$. $c_1^N$ and $u_1^N$ are binary vectors with length $N=2^n$, where N denotes the codeword block-length. The generator matrix $G_N$ may be defined by the Kronecker power of $$F = \begin{bmatrix} 1 & 0 \\ 1 & 1 \end{bmatrix},$$

for example as set forth in Equation (2):

$$G_N = F^{\otimes n} \quad (2)$$

where $(\ )^{\otimes n}$ stands for the n-th Kronecker power of $(\ )$. In some examples, $G_N = B_N F^{\otimes n}$, where $B_N$ may denote a bit reversing matrix that may change the order of elements in $u_1^N = [u_1, u_2, \ldots, u_N]$. The bit reversing operation is disclosed herein.

It is contemplated that $G_N = F^{\otimes n}$ unless otherwise noted herein. Some input bits for a polar code may have a fixed value (for example usually zero) and the fixed values may be referred to as "frozen bits". The input indices for the frozen bits may be represented by the set $A^c = \{a_1^c, a_2^c, a_3^c, \ldots, a_{N-K}^c\}$ and $a_i^c < a_j^c$ if $i<j$. The remaining portion of input bits for the polar code may convey variable information bits and the variable information bits may be referred to as "unfrozen bits". The input indices for unfrozen bits may be represented by the set $A = \{a_1, a_2, a_3, \ldots, a_K\}$ and $a_i < a_j$ if $i<j$.

The number of information bits (or unfrozen bits) may be defined as K and the number of frozen bits may be N−K, where N and K are integer values. The code rate R of the polar code may be defined as K/N. The process of determining input bit indices for frozen bits and/or unfrozen bits may be referred to as "code construction" for the polar code.

FIG. 2 is block diagram illustrating a representative polar encoder (e.g., for N=8). Referring to FIG. 2, a polar coder 200 may have, as input, data bits u1, u2, u3 . . . u8 and may have, as output, encoded bits c1, c2, c3 . . . c8. The polar encoder may include a plurality of nodes including input nodes, intermediate nodes and output nodes represented, for example by (i, j), where i=1, . . . , N and j=0, . . . , n. In the representative polar coder, for c8, the input bit u8 may not be modified at intermediate nodes (8, 1) and (8, 2) such that c8 at output node (8, 3) may be the same as input bit u8. For c7, the input bit u7 and the input bit u8 may be summed at or prior to node (7, 1) such that c7 at output node (7, 3) may be the same as the sum of input bits u7 and u8. For c6, the input bit u6 and the input bit u8 may be summed at or prior to node (6, 2) such that c6 at output node (6, 3) may be the same as the sum of input bits u6 and u8. For c5, the input bit u5 and the input bit u6 may be summed at or prior to node (5, 1) and this sum may be summed with the sum of the output from input bits u7 and u8 at or before node (5, 2) to generate encoded bit c5. For c4, the input bit u4 and the input bit u8 may be summed at or prior to output node (4, 3) to generate encoded bit c4. For c3, the input bit u3 and the input bit u4 may be summed at or prior to node (3, 1) and this sum may be summed with encoded bit c7 (e.g., the sum of the output from input bits u7 and u8) at or before output node (3, 3) to generate encoded bit c3. For c2, the input bit u2 and the input bit u4 may be summed at or prior to node (2, 2) and this sum may be summed with encoded bit c6 (e.g., the sum of the output from input bits u6 and u8) at or before output node (2, 3) to generate encoded bit c2. For c1, the input bit u1 and the input bit u2 may be summed at or prior to node (1, 1) and this first sum may be summed with the sum of the output from input bits u3 and u4 at or before node (1, 2), as a second sum. The second sum may be summed with encoded bit c5, to generate encoded bit c1.

Although FIG. 2 illustrates a polar encoder with N=8 with a particular node structure, other node structures are possible. For example, N may not be equal to 8 (e.g., has differing numbers of inputs, for example a larger number of bit inputs, i=16, 24 etc.) and/or the polar coder may have a different number of node levels (e.g., a larger number of node level, for example j=4 or 5).

Although FIG. 2 illustrates a polar encoder with a particular node interconnection, other node interconnections are possible. For example, other summation (e.g., interconnection operations) are possible and/or other interconnection locations are possible.

There can be several different code construction methods/operations developed for polar coding. For example, the methods may calculate (e.g., initially calculate) a reliability of the input bit indices (e.g., each input bit index), and may have an order of bit index reliabilities before starting the encoding operation. From the obtained reliability order, the least reliable input bits may be assigned, as frozen bits and the remaining bits may be assigned, as unfrozen information bits. The proportion of frozen and unfrozen bits may be determined according to a desired code rate. With the frozen and unfrozen bit locations available, the encoding operation may be set forth as in Equation (1) and as illustrated in FIG.

2. FIG. 2 may implement procedures as set forth in, for example 3GPP NR such as technical standard 38.212.

The decoding algorithm for a polar code may be categorized into Successive Cancellation (SC) algorithm-based decoding and Belief Propagation (BP) algorithm based decoding. The SC polar decoding may be a sequential decoding operation or procedure, for example to calculate a Log-likelihood ratio (LLR) value of input bits in a serial manner. It is contemplated (e.g., based on an assumption) that previously decoded bits are correct. The previously decoded bits may be used for decoding other bits (e.g., the current bit or bits in the serial operation). SC List (SCL) decoding may use a plurality of lists of candidate paths, for example to improve the performance of SC decoding. The best list may be selected according to an outcome of an LLR calculation. CRC Aided SCL (CA-SCL) decoding may use an embedded CRC as a tool to select the list. By CA-SCL decoding, the polar code may achieve error performance comparable to or superior to a conventional LDPC code or a conventional turbo code.

In another representation, which is denoted as a Tanner graph representation of a polar code, a polar code may be decoded by a message passing algorithm according to a sum product algorithm or a min sum algorithm. In some applications of a channel code, a code type may be a "systematic" code type. In systematic codes, the input data may be embedded in the encoded output. The systematic code may have the information bits as its code bits. The systematic polar codes may be implemented by cascading two encoders. The systematic polar codes can provide a better Bit Error Rate (BER) performance than non-systematic polar codes, although the BLock Error Rate (BLER) performance may be the same.

FIG. 3 illustrates a representative systematic polar encoder 300. Referring to FIG. 3, input information bits 305 (e.g., frozen bits and unfrozen bits (e.g., systematic bits)) may be input to a non-systematic polar encoder 310. The output of the non-systematic encoder 310 at locations associated with frozen bits (e.g., based on the frozen indices) may be set to zero at 320. Decoded bits that correspond to the coded bits from the non-systematic encoder 310 may be input with the output from 320 (e.g., the out of the non-systematic polar encoder 310 with zeros at locations associated with the frozen bits) to non-systematic polar encoder 330. The output coded bits 335 of the non-systematic polar encoder 330 may include parity bits and unfrozen bits (e.g., systematic unfrozen bits).

For example, in certain systematic polar code implementations, the information bits may be encoded a plurality of time (e.g., twice) by the non-systematic encoder with the same code construction (e.g., with the same frozen and unfrozen bit indices). The encoded bits from the first non-systematic encoding may be partially input to the second non-systematic encoder. In cases in which the same encoder structure is used, for example as illustrated in FIG. 2, and for which i is the index of unfrozen bit (∈ A), the coded bit with index i from the first non-systematic encoder may be the input bit with index i to the second non-systematic encoder. When i is an index of frozen bit (∈$A^c$), a predefined value (e.g., usually zero) is the input to the second non-systematic encoder. For the example in FIG. 2, $d_4=u_4$, $d_6=u_6$, $d_7=u_7$, $d_8=u_8$ when $d_i$ denotes output coded bits after the second non-systematic encoder 330 and $u_4$, $u_6$, $u_7$, $u_8$ are unfrozen bits (A={4,6,7,8}).

When the decoding procedure is performed in the receiver based on a non-systematic polar code (for example, using CA-SCL and/or BP), the information bits cannot be directly acquired, for example because the decoded bits correspond to (e.g., still correspond to) the coded bits (e.g., which were first coded by the non-systematic encoder as illustrated in FIG. 3. To generate the final information bits, an additional decoding process (e.g., encoding of the decoded bits) may be used, appropriate and/or required.

Representative Ratematching Procedures for Polar Codes

In practical applications of channel codes for communications, flexibility in code block length and code rate may be implemented to adapt to time varying channel environments and various QoS requirements. Ratematching may be one procedure (e.g., a primary procedure) to provide such flexibility and an example of an optimized ratematching algorithm for polar codes is set forth in the 3GPP NR standard TS 38.212). Ratematching for polar codes may be divided into or include any number of operations/procedures including (1) one or more puncturing operations/procedures, (2) one or more shortening operations/procedures and/or (3) one or more repetition operations/procedures.

The puncturing procedures for polar codes may correspond to excluding some predetermined number N–M of output coded bits in the transmission, for example where M may be the number of bits after ratematching and N>M may be set and/or necessary in case of puncturing. A specific pattern for indexing punctured bits may be defined and the pattern may be shared with shortening and/or repetition based on the structure of a circular buffer. When the code rate is less than a specific threshold value, a puncturing procedure may provide a better BLER performance than a shortening procedure. The input bits with the same index as the index of the punctured output bits may be set to zero, as frozen bits, in the encoding process and the LLR values of the punctured bits may be set to zero in the decoding of the punctured polar coded block. For example, in FIG. 2, if $c_i$ (i=1, . . . , 8) is selected as a punctured bit, then $u_i$ may be assigned as a frozen bit, and the value of the $u_i$ may be set to zero. The punctured bits may not be removed from the coded bits after encoding, may not be transferred to the next module (for example, a modulation mapper), and may not be transmitted in the channel. The puncturing pattern may start from the bit index 1 (or another bit index start position).

The shortening procedure for polar codes may correspond to excluding some predetermined number N–M of the output coded bits in the transmission. When the code rate is larger than a specific value (for example the same threshold value as used in the puncturing procedure), the shortening procedure may provide a better BLER performance than the puncturing procedure. The input bits with the same index as the index of shortened output bits may be set to zero as frozen bits in the encoding process and the LLR values of punctured bits may be set to infinity in the decoding of the shortened polar code block. The shortened bits similarly may not be removed from the coded bits after encoding, may not be transferred to the next module (for example, the modulation mapper), and may not be transmitted in the channel. The shortening pattern may start from the bit index N, for example (or may start from some other index start position).

The repetition scheme/procedure may correspond to repeating some predetermined number M–N of the output coded bits in the transmission, where the condition N<M may be used, appropriate and/or necessary as the number of bits increases after repetition. The repetition procedure may be used for a MCB (e.g., only for the MCB) with a length of $N=2^n$ as such a repetition procedure may provide better performance than the puncturing procedure or the shortening procedure when M is near to (e.g., close in value to) N. The MCB (e.g., mother code block) may be defined as the code without ratematching (e.g., puncturing, shortening and/or repetition) and the MCB may have a length of $N=2^n$. For example, the MCB may be an encoded bit block obtained without the shortening operation in the encoder and/or the shortened polar code block may be an encoded bit block obtained with the shortening operation in the encoder.

A part of the encoded bits may be selected for repetition and the selection may be based on the shared pattern with puncturing and/or shortening provided for example by a subblock interleaver. A circular buffer implementation may be used herein. LLR values corresponding to the repeated (encoded) bits may be combined with the original (encoded) bits by summation (e.g., simple summation). The performance of repetition may not or does not depend much on the pattern of repeated bit indices.

The puncturing, shortening and/or repetition procedures for ratematching have less or comparable complexity requirement in comparison to (e.g., relative to) the original MCB in cases in which the combining operation of LLRs is not included in the total complexity.

Representative HARQ Procedures for Polar Codes

The HARQ schemes for polar codes may be categorized into a plurality of procedures (e.g., two procedures). A rateless polar code based on the Incremental Freezing (IF) may be implemented as an IR HARQ scheme. In the IR HARQ scheme, part of information bits in the first transmission may be transmitted in retransmissions, for example after the first transmission of the HARQ process by an IF operation. The decoding of retransmissions for IF HARQ may be sequential, for example when SC-based decoding is applied. For example, after decoding the second transmission, the first transmission may be decoded. The decoded bits obtained from the second transmissions can be considered and/or used as the frozen bits in the decoding of the first transmission. When the decoding of the second transmission is successful (e.g., confirmed by a CRC check), the code rate of the code block to be decoded in the first transmission can be reduced, and the error performance of a total decoding process can be improved. The decoding of further possible retransmissions, for example a third transmission, may follow similarly in the same sequential manner.

FIG. 4A is a diagram illustrating a representative polar encoder 400 using an IR HARQ scheme (e.g., with one retransmission). FIG. 4B is a diagram illustrating a representative KE for a second transmission (and/or retransmission) using the representative polar encoder of FIG. 4A.

Referring to FIG. 4A, first input bits of a first transmission at 405 may be input to a polar encoder 410. The output (e.g., first coded bits) associated with the first input bits may form a first transmission block at 415. Second input bits of a second transmission at 435 may be input to a polar encoder 410 (or another polar encoder having the same length as polar encoder 410). The first coded bits (e.g., associated with the first input bits) output from the polar encoder 410 may be stored in a buffer/memory (e.g., a circular buffer 740 (as illustrated in FIGS. 7A and 7B, another buffer and/or memory).

At 440, the output (e.g., second coded bits) of the polar encoder 410 associated with the second input bits may be combined with (e.g., via an exclusive OR operation, for example a bit-by-bit XOR) the first coded bits previously output from the polar encoder 410 or from the buffer. The output of the combination at 440 may form a second transmission block at 450.

Referring to FIG. 4B, for the second transmission, the non-systematic polar encoder 400 may receive input bits 405 and input bits 435. The input bits 405 may include frozen bits 455 and unfrozen bits 460. The input bits 435 may include frozen bits 465 and a subset 470 of the unfrozen bits from the first transmission. The non-systematic polar encoder 400 may output N polar coded bits previously sent in the first transmission and N coded bits of the second transmission polar coded bits.

For example, an IR HARQ scheme by KE may be implemented. The MCB length of the polar codes may be set to increase for the retransmissions in the IR HARQ scheme. In FIG. 4A, the coded bits for the second transmission, (e.g., the first re-transmission) may be transmitted after performing an exclusive OR (XOR) operation in a bit-by-bit manner with the first transmitted code block. If the first transmitted code block and the second transmitted code block are combined, the combined code block may be a single polar coded block with a length of 2N. A single decoding algorithm (e.g., without a sequential procedure as in IF) may be applied for decoding. The second transmission may be considered as the transmission of an additional block to configure a whole code block of length 2N.

A procedure to configure unfrozen bits in the second transmission may be implemented, for example based on channel capacity (e.g., channel capacity aspect/rules/parameters). For example, code construction of the additional block with length N (e.g., the additional code block in the second transmission) may be defined/implemented to select particular unfrozen bits and/or frozen bits. For example, the channel capacity for the 2N polar coded bits including the first transmission may be calculated and may be compared to find/select the unfrozen bits of the additional block which have larger channel capacity than the first transmission. Other retransmissions may be incorporated in the same manner. As an example, the input bits with a length of 2N may be encoded by a polar encoder with a length of 2N and may be transmitted as the 3rd transmission after having (e.g., completing) an XOR operation with the previously transmitted blocks (e.g., all of the previously transmitted blocks), where all of the transmitted blocks may be considered as a single polar coded block with a length of 4N.

The bolded black outlined box on the left side in FIG. 4B may represent the input bits transmitted in the first transmission with a length N including frozen and unfrozen bits. In a second transmission, the input bits may be extended to the length of 2N and their encoding process may be implemented as the encoding of 2N input bits. Parts of unfrozen bits in the first transmission may be copied to the extended part, for example in this case more reliable unfrozen bits which have a larger bit channel capacity or reliability than other unfrozen bits are available in the additional extended block. For example, the same unfrozen bits in the gray shaded box may be included in the second transmission. Since the unfrozen bits corresponding to the bolded black outlined box and gray shaded box may be sent (e.g., may be already sent) in the first transmission, these unfrozen bits cannot be changed in the receiver side. The extended block can be transmitted in the second transmission, as illustrated by the bolded gray outlined box.

When SC-based decoding is performed in the receiver, the copied bits may be decoded before the original bits in the first transmission. The original bits which were copied in the first transmission are considered/used as frozen bits and their values (e.g., 0 or 1) are set to the same value as the decoded ones of copied bits. The copied bits in the extension part may have a higher reliability than the original bits and the error performance of the original bits may be worse than the copied bits.

In this HARQ scheme, the same KE method/procedure/operation may be applied for the retransmission after the second transmission. For example, this may require and/or may use a code block length in the retransmission that may increase by an exponent of 2, which may result in the increase of decoding complexity by an exponent of 2.

An IR HARQ (e.g., a simple IR HARQ) scheme for URLLC may use polar codes. In one scheme, a low code rate may be used (e.g., is contemplated/assumed) and puncturing may be considered as a basic ratematching method/procedure/operation. In retransmissions, the transmitter may transmit punctured bits (e.g., which are or may not be transmitted in the first transmission) with a priority. In the retransmissions, some of the unpunctured bits after the puncture bits are transmitted (e.g., after all of the punctured bits are transmitted) may be repeated. When the punctured bits of the first transmission are transmitted in the retransmissions and combined in the decoding, the new code block which has some unpunctured bits in comparison to the first transmission may be considered for code construction. For example, when N-M bits are punctured in the first transmission, the corresponding input bits to the punctured bits are handled as frozen bits and these bits may be originally unfrozen bits of the corresponding unpunctured and optimized polar code construction. If the corresponding input bits have an arbitrary value (e.g., an information value) instead of a predetermined value (e.g., zero), this can affect the other coded bits in the polar encoding process/operation. The first transmitted bits cannot be changed by the reconstruction and the error performance may degrade as the overall code construction after combining cannot be optimized anymore. For sufficiently low code rate (e.g., below a threshold code rate), the corresponding input bits are usually frozen bits (for example in a case that the puncturing is done for polar coded bits with low indices and the corresponding input bits are not included in unfrozen bits) and performance degradation may not be observed. For a low enough code rate, the density of unfrozen bits in a lower index (e.g., below a threshold) is also usually low and bits (e.g., all bits) with a lower index (e.g., below a threshold) may be frozen bits in the polar codes.

For example, a similar approach may not or cannot be applied for shortening. The original full code block before shortening may not or cannot be configured by the addition of shortened bits in the retransmissions. For a high code rate (e.g., above a threshold code rate), shortening may show better error performance than puncturing and at least one of the corresponding input bits to shortened bits (e.g., shortened, for example by setting the input bit to zero or a default value) may correspond to unfrozen bits. The change of previously transmitted bits by changing corresponding input bits from frozen to unfrozen cannot be possible and cannot demonstrate optimized performance when combined in the decoding process or the retransmission.

Another difference between puncturing and shortening may be caused by the fact that the lower indices of polar coded bits may be influenced by the higher indices of input bits. The indices of input bits corresponding to the shortened bits are usually high valued indices and they can alter almost all coded bits with lower indices. The indices of input bits corresponding to the punctured bits are usually low valued indices and their influence on the other coded bits may be much smaller than in the case of shortening.

Representative Critical Set

The term "Critical set" is used for polar decoding by a bit flipping algorithm. The critical set is a set of bit indices which potentially encounter the first errors compared to other bit indices. The first input index of full rate component polar codes in the total polar code may be gathered as a set and the set may be defined as a critical set. The full rate component polar code may mean that all input bits of a component code are unfrozen.

The first bit of input bits in a full rate component code is less immune to errors than the other bits because the first bit is in the worst bit position (e.g., which cannot enjoy the benefit of polarization within the component code). Errors may almost always be found in the critical set when there exists a block error. In bit flip decoding, the critical set may be used as candidates to be flipped for trials to obtain final decoding success.

The State of the Art (SoA) HARQ schemes by IF and KE for polar codes may be based on the addition of supplemental (e.g., which correspond to the retransmissions in IF HARQ schemes) polar codes or the extension of an MCB, as retransmissions. The implementation module in the decoder for the supplemental polar code and/or KE may not or cannot be fully utilized during a significant portion of the transmission period in case there is no or a very small number of retransmissions. The SoA HARQ schemes for polar code may not demonstrate good area efficiency.

In certain representative embodiments, for example, when the code block length in the first transmission is N, and when the HARQ by a KE method/procedure/operation is performed, a decoder implementation for a code block length of 2N may be used and/or required to incorporate the second transmission and its decoding. This may result in more than two times the decoding complexity and/or a latency increase in case of SC based decoding. For example, more than half of the decoder may not be utilized for transmissions (all or essentially all of the transmissions) that correspond to successful, no HARQ based transmissions. The increase in complexity and/or in latency may scale rapidly with the number of retransmissions. The increase in complexity may cause a reduction in area efficiency, as may be observed in Equation (3) as follows:

$$\text{Area efficiency } [Mb/s/\text{mm}^2] = \frac{\text{throughput}[Mb/s]}{\text{area}[\text{mm}^2]}$$

where the throughput is the amount/number of bits to be decoded within a given unit time and area is an area of implementation.

The additional complexity caused by the decoding of retransmissions in the SoA HARQ schemes for polar code may result in an increase of chipset area, which may correspond to a reduced area efficiency.

In certain representative embodiments, in a case of IF HARQ, the sequential decoding may reuse the existing decoder architecture and may result in an additional latency, for example due to HARQ retransmissions.

In a practical polar decoder implementation, a maximum MCB length of the polar code exists which may be supported and processed under a given timing (e.g., timing requirement). The recently developed HARQ schemes for polar codes may not or cannot be used for the maximum code block length when a high area efficiency (e.g., above a threshold level) is set and/or is required.

For example, instead of using the recently developed HARQ for polar codes, efficient HARQ by repetition methods/operations may be implemented (e.g., a viable approach) to ensure high throughput and high area efficiency. In this case, some performance gains in decoding retransmissions may be sacrificed.

In various representative embodiments, when polar codes are heavily punctured or shortened to ensure high code rate, the repetition may not or cannot achieve and provide sufficient coding gain. In high throughput applications, the code rate in the first transmission of the HARQ is usually contemplated to be high (e.g., above a threshold level) for efficient utilization of time/frequency resources.

Retransmissions by NACK responses in addition to the first transmission may lower the code rate of code blocks (e.g., overall combined code blocks) in the decoding. A better error performance by the HARQ retransmissions may be achieved, for example by such an approach of lowering the effective code rate The repetition in retransmissions may be considered as one of code extension, and for example may result in a lower code rate. For example, the code rate may be halved and the free Hamming distance may be doubled in case of the second retransmission with the same (e.g., exactly the same) code block as the first transmission.

When there is a high degree of puncturing and/or shortening (e.g., above a threshold value/level) for the first transmission, the parameters involving error performance (for example, a free Hamming distance) may substantially degrade in comparison with the original MCB parameters without puncturing and/or shortening.

For a same number of total received bits by retransmissions, the repetition over shortened polar code shows poorer error performance than the repetition over original mother polar code (without shortening) (e.g., prior to a shortening operation).

One way to improve the HARQ process/mechanism/operation may be based on adaptively selecting between the repetition of a shortened polar code and the repetition of the original polar code for retransmissions. This implementation may result in poor resource utilization, for example because the shortening procedure/operation applied on a polar code may substantially alter the code compared with the original code. The received code block in the previous retransmissions may not or cannot be shared among the adaptive selections (e.g., two adaptive selections) and may not or cannot be used for a combined decoding of the code block of interest. When systematic polar codes are used instead of non-systematic polar codes, the systematic bits in the previous transmission may be reused and the systematic polar codes can have better resource utilization.

IF HARQ methods/procedures/operations may be implemented and may cause substantial complexity at the decoder side, which may limit high throughput and high area efficiency operations. Low-complexity methods/procedures/operations that are relevant for and/or extensions of IR-HARQ techniques may be used and/or necessary. For instance, as an extension to IF HARQ, only a small coded block of the second transmission which does not introduce much increase in complexity may be implemented.

SC based decoding schemes may cause additional latency, for example due to the sequential nature of decoding process/operation for IF.

In other representative embodiments, a HARQ scheme based on KE method/procedure/operation may be implemented, for example to improve systematic polar code BLER performance. Methods/procedures/operations, for example to overcome issues due to combining a systematic encoder and KE may be implemented for an efficient systematic polar code HARQ scheme.

Representative HARQ Operations for Shortened Systematic Polar Code

The systematic polar codes, for example due to their structure (e.g., special structure for example using embedded input bits in encoded codeword), may provide a benefit of sharing part of code blocks transmitted during various retransmissions. Systematic bits of a code block in the first transmission may be used as systematic bits of the overall (e.g., total) code that is formed by combining all transmissions during the decoding process/operation. Utilizing these systematic bits, a HARQ scheme that may select (e.g., adaptively select) a retransmission mode among the shortened polar code based scheme and the original polar code based scheme for optimized HARQ throughput performance, may, for example provide improved performance.

In certain representative embodiments, depending on the parameters including, for example the code rate, target error rate and/or number of shortened bits in the first transmission of systematic codes in the HARQ process, a plurality of options (e.g., at least two different options) can be used for retransmissions.

FIGS. 5 and 6 are diagrams illustrating a representative HARQ process.

Referring to FIG. 5, the representative HARQ process 500 may include, at operation 510, a transmitter (e.g., a WTRU 102 or access point/gNB 180, among others) determining or obtaining one or more transmission parameters including any of: (1) a code rate R; (2) a shortening number (sometime referred to as S or SN); (3) a Block Error Rate (BLER); and/or; (4) a selection threshold value T. At operation 520, the transmitter 102/180 may transmit a first transmission. After the first transmission, at operation 530, the transmitter 102/180 may wait for an acknowledgement (ACK) or a negative ACK (NACK). At operation 540, if the transmitter 102/180 receives an ACK from a receiver (e.g., a different one of the WTRU 102 or the access point/gNB 180, among others), the first transmission is successful and the HARQ operation 500 may end. If the transmitter 102/180 receives a NACK from the receiver 102/180, the first transmission is not successful and the HARQ operation 500 may continue at operation 550. For example, the transmitter 102/180 may determine whether the first transmission was successful via reception of a ACK or whether the first transmission was unsuccessful via reception of a NACK. In some instances, the transmitter 102/180: (1) may not receive an ACK or a NACK (e.g., a HARQ timer may expire) such that the transmitter 102/180 may treat the first transmission as unsuccessful; or (2) may receive the ACK or NACK but may not be able to decode the ACK or NACK such that the transmitter 102/180 may treat the first transmission as unsuccessful. At operation 550, the transmitter 102/180 may determine whether to perform one of as plurality of options (e.g. option 1 or option 2). The determination may be based on or in accordance with, for example whether a shortening number S exceeds the selection threshold value T. At operation 560, if the transmitter 102/180 determines that the shortening number S exceeds the selection threshold value T, processing may proceed to operation 560. At operation 560, the transmitter 102/180 may determine whether or not the NACK is a first NACK. If the NACK is a first NACK, at operation 570, parity bits, for example from MCB stored in a circular buffer 740, may be prioritized and some or all of the parity bits may be transmitted in the second transmission. If the NACK is not the first NACK (e.g., is a second or further NACK), at operation 580, the retransmission may include bits selected from the MCB stored in the circular buffer (e.g., circular buffer 740). At operation 550, if the transmitter 102/180 determines that the shortening number S is equal to or does not exceed the selection threshold value T, processing may proceed to operation 590. At operation 590, the transmitter 102/180 retransmit bits stored in the circular buffer 740 (e.g., containing or including a shortened polar code block). Processing from operations 570, 580, and 590 may move to operation 530.

For example, initially, the transmitter 102/180 may determine the transmission parameters for the given bit block (length N with K information bits) including the code rate R, shortening number S. The code rate may be identified based on the desired data rate, channel condition between the transmitter 102/180 and the receiver 102/180, and/or resource availability which may be conveyed from higher layers (e.g., any layer above layer 1 such as Layer 2 (L2) to Layer 1 (L1)). The transmitter 102/180 may identify the HARQ option selection threshold value T, for example depending on or in accordance with: (1) the target BLER value (e.g., which may be conveyed from the higher layers), (2) initial MCB (e.g., mother code) rate; and/or (3) code length. The selection threshold value T that is available at the transmitter 102/180 may be used to identify which HARQ option may be or is to be selected by the transmitter 102/180 depending on the NACK feedback from the receiver 102/180.

The selection threshold value T may be calculated as set forth in Equation 4 as follows:

$$T = N \cdot f\left(\frac{K}{N}\right) = N \cdot f(R_M) \approx N \cdot (aR_M + b). \quad (4)$$

The initial MCB (e.g., mother code) rate $$R_M = \frac{K}{N}.$$

T is a decreasing nonlinear function of $R_M$, denoted by f, and may be approximated by a linear equation with three parameters N, a and b. The slope a is a negative real number. N in the equation is used for normalization.

In one example, the actual value of a and b may be determined by simulations. The simulations may be conducted from $R_M$=0 to 1 with a predetermined incremental value of $\Delta R_M$ and with the number of simulation points $R_M/\Delta R_M$. For each simulation point, the shortening number S that provides or shows better BLER (or BER) performance of the mother polar code with repetition than a repeated shortened code may be searched at a given target BLER. In the search operation, the number of repetitions may depend on the strategy of retransmissions, for example a strategy that may use circular buffer operations in FIG. 7B, in which the same number of total transmitted bits between two schemes (e.g., the repeated MCB or repeated shortened polar code block) may be implemented as one option. The simulation process for each incremental step of the initial MCB (e.g., mother code) rate is similar to the processes shown in FIG. 9 and FIG. 10.

After full evaluations to obtain the threshold shortening number for each code rate incremental, a and b can be estimated to ensure minimum difference between simulation and linear approximations such as via a linear regression operation.

Referring to FIGS. 5 and 6, depending on the parameters including a code rate, a target error rate and/or the number of shortened bits in the first transmission of the systematic codes in the HARQ process/operation, various options (e.g., two different options) may be used for retransmissions.

In a first option, the MCB without shortening (e.g., prior to a shortening operation) may be saved/stored in a buffer (e.g., a circular buffer 740) after interleaving and the retransmitted bits may be selected in a circular manner from the buffer 740. For example, the parity bits may be prioritized and some or all of the parity bits may be transmitted in the second transmission.

In a second option, the polar code block with shortening (e.g., the shortened polar code block) may be saved/stored in a buffer (e.g., a circular buffer 740) after interleaving and bit selection. The retransmitted bits may be selected in a circular manner from the buffer 740.

Representative 1$^{st}$ Transmission

Referring to FIG. 6, input bit to the polar encoder 640 may include frozen bits 610, unfrozen bit 620 and shortened bits that are frozen 630. The coded bits output from the polar encoder 640 include polar coded bits 650 and shortened bits 660 (e.g., corresponding to the shortened frozen input bits. The first transmission for the HARQ operation may include N-S polar coded bits. N denotes the total number of bits when no shortening operation is applied in the polar encoding operation. S denotes the number of shortened bits and the code rate may be $$R = \frac{K}{N-S},$$

where K in the number of unfrozen input bits.

The input bits that may correspond to information bits and CRC bits, may be allocated to unfrozen bits and the remaining bits may be frozen bits. The input bits, that may correspond to shortened output bits, may be set to a specific value (usually 0) and can be treated as additional frozen bits.

The polar encoder in the HARQ scheme is contemplated to be systematic. The output coded bits may include the same bits as the input bits which have the same index as the corresponding input bits.

Once an information block is encoded by the polar encoder and transmitted to the receiver after certain operations (ratematching, interleaving and/or modulation, among others), the transmitter 102/180 may wait for the response from the receiver 102/180 which may be delivered by the control channel (e.g., or another channel). The response from the receiver 102/180 may indicate whether the first transmission was successfully decoded via an acknowledgement (ACK) or not successfully decoded via a negative ACK (NACK) and/or a HARQ timer expiry. When the response is an ACK, the transmitter 102/180 may finish the transmission related to the delivery of the information block and may attempt (e.g., try) to send another information block.

When a NACK is received, the transmitter 102/180 may determine or decide one or more options for HARQ retransmission (e.g., for retransmission associated with the HARQ process). Once the operation corresponding to selection of the option is executed (e.g., a retransmission or a further transmission is executed), the transmitter 102/180 may go into a waiting state (e.g., at operation 530) to wait for a response from the receiver 102/180.

Representative Operations for Transmitter (Tx) HARQ Selection

Depending on the code rate R with (and/or without) shortening, target BLER and the shortening number S, the transmitter 102/180 may select or choose option 1 or option 2, for example according to the identified selection threshold value T at the transmitter 102/180. It is contemplated that the selection threshold value T may be determined using the parameters including BLER, and code rate R as set forth herein. For example, if the shortening number S exceeds the selection threshold value (e.g., S>T), option 1 may be selected and otherwise, option 2 may be selected for the HARQ mechanisms/process after the first transmission and the first NACK reception.

In one option, the selection of option 1 and option 2 is fully decided in a deterministic manner. The transmitter 102/180 may determine the code rate R of the transmitted polar coded block and the shortening number S (corresponding to the code rate R) may also be determined. A simple (or approximate) relation between the shortening number S and the selection threshold value T, depending on the target BLER (or BER), can be defined by the above offline evaluations. If the transmitter 102/180 informs the code rate R to the receiver 102/180 by the control channel (for example, by a New Radio Physical Downlink Control Channel (NR-PDCCH)), option 1 or option 2 can be decided based on rules (e.g., automatically based on the rule) as described herein. The informing of the code rate R by the transmitter 102/180 can be based on indirect method like resource allocation for a fixed information length. In this case, the shortening number S (e.g., only the shortening number) may be used for selection of option 1 and option 2. When puncturing (which may be assumed for the code rate value less than the specific predetermined code rate value), the other HARQ method can be used because the puncturing may have better error performance in the first transmission than the shortening in those code rate ranges.

In another option, instead of sending just a NACK message (e.g., only a NACK message), the receiver 102/1280 may inform the transmitter 102/180 about the retransmission option desired by the receiver 102/180. In this case, the receiver 102/180 has the necessary parameters, e.g. shortening number S, and/or code-rate R, which can be conveyed from the transmitter 102/180 via a control channel, e.g. NR PDCCH. The BLER target may be known by the receiver 102/180 (which may be similarly conveyed by NR PDCCH, or directly from the higher layers, e.g. L2 and above, based on the application requirement. The transmitter 102/180 may inform the receiver 102/180 about the HARQ option selection threshold value T, or in another option, the receiver 102/180 may directly calculate the selection threshold value T with the necessary parameters available to itself.

Moreover, in addition to a comparison of the shortening number S to the threshold selection value T, the HARQ option selection operation 550 may include an evaluation of the number of consecutive NACK messages received from the receiver for the transmission or retransmission of a given packet. For instance, once Option 1 is selected for retransmission, e.g. due to the shortening number S exceeding the threshold selection value T (e.g., due to S>T), after two or more NACK messages are received for a given packet, the transmitter 102/180 may decide to switch to Option 2 for further retransmissions. In this case, in the retransmissions, instead of the parity bits of the MCB, shortened code block bits selected from the buffer 740 can be retransmitted. Similarly, once Option 2 is selected, due to the shortening number S equaling of not exceeding the threshold selection value T (e.g. due to S<T), after one or more additional NACK messages are received, the transmitter 102/180 can switch to Option 1 and transmit parity bits of the MCB instead of the shortened code block bits. For example, the transmitter 102/180 can alternatively choose between Option 1 or Option 2 retransmission for each retransmission based on the calculated selection threshold value T, or other parameters such as number of NACK messages received.

In one example, under a specific target BLER and a specific initial mother code rate (=K/N), there may be a threshold value T for the selection decision. For example, if the shortening number S exceeds the threshold selection value T (e. g., S>T), option 1 may be selected and otherwise, option 2 may be selected as the HARQ operation for the remaining HARQ mechanism after the first transmission and the first NACK reception.

Representative Circular Buffer Structure (e.g., Used for Option 1 and/or Option 2)

FIGS. 7A and 7B are diagrams illustrating the transmitter structure for HARQ including a circular buffer. Referring to FIGS. 7A and 7B, the selection of bits for transmission including option 1 and option 2 follows the circular buffer-based operation set forth herein.

A transmitter structure 700 for HARQ may include a polar encoder (e.g., polar encoder module/block 710, an interleaver 720, a bit selection 730, and/or a circular buffer 740. The circular buffer 740 may include memory registers $C_1$, $C_2$, $C_3$, ... $C_{N-1}$ and $C_N$. The coded bits after the polar encoder 710 may be interleaved by the interleaver 720 based on a specific pattern. A first example may be an interleaver 720 using a pattern (e.g., a natural order pattern) such that the output of the interleaver 720 is the same bit sequence as the input bit sequence without any change in order. Another example may be a subblock interleaver. After interleaving, parts of bits may be selected by the bit selection 730 and saved in the circular buffer 740. The bits that are not selected may be punctured bits or shortened bits in a ratematching process/procedure/operation. In the bit selection function/procedure/operation, the bits which are to be punctured or shortened after encoding at the polar encoder 710 and/or interleaved at the interleaver 720 may not be delivered to the circular buffer 740. In a case of shortening, the code bit with a shortened bit index after polar encoding usually has a value of zero, but other values are possible.

The bits saved/stored in the circular buffer 740 may be delivered to the next procedure (for example, a channel interleaver and/or a modulation mapper) in a circular manner. Referring to FIG. 7B, the coded bits $c_1, c_2, c_3, \ldots, c_{N-1}, c_N$ are saved/stored in the circular buffer 740 when the interleaver 720 is a simple natural order interleaver and there is no puncturing and/or shortening. In the circular buffer 740, a bit can be selected as the starting bit, for example, c1 as the first delivered bit to the circular buffer 740. The last bit in the circular buffer 740 in this example is $c_N$ and the next bit after $c_N$ can be defined as $c_1$ in a circular manner. The bits of specific numbers may be delivered/provided from the starting bit as shown in FIG. 7B. When the next transmission is to be sent (e.g., is required), the bits may be delivered/provided from the next bit after the last bit delivered in the previous transmission. When the given number of transmitted bits is not completed after the last index bit, the operation can continue the remaining bit delivery from the starting index bit. The given number of transmitted bits in retransmissions may be predetermined (e.g. preconfigured) by predetermined rules or determined (e.g., decided) by high layer signaling depending on one or more measurement reports of the channel status provided via a feedback control channel.

Representative Operations for Option 1

When Option 1 is determined and/or selected to be used, the MCB based retransmission may be applied. The MCB may be defined as the code block before shortening (or without shortening) with a code block length of $N=2^n$. The MCB may be saved/stored in the circular buffer 740 without a bit selection process/operation (e.g., as there is no shortening operation) and the saved/stored bits in the circular buffer 740 may be selected for retransmission based on the circular buffer management operations, as described herein.

The parity bits in the MCB may be prioritized by the interleaver operation/function for the second transmission. The interleaver operation/function may gather indices of systematic bits into a group (e.g., one continuous group) of indices and may gather indices of parity bits into another group (e.g., another contiguous group) of indices.

Within a group (e.g., each group), in some examples, the interleaver operation/function may shuffle the bit indices. For example, the selection for the second transmission may start from the first index of the group of parity bit and the parity bits may be prioritized by choosing (e.g., appropriately choosing) the index in the circular buffer 740. The number of the selected bits for the second or further transmission may be the same as the number of the parity bits. For example, all (full) parity bits of the MCB may be selected for the second transmission. Another number of bits (e.g., parity bits and/or other bits) for the second transmission may be used/allowable, but the full parity transmission may be appropriate and/or preferred.

One example of the interleaver 720 can be described as below.

The interleaver 720 in the second transmission may be described as set forth in Equations 4 and 5 as follows:

$$I_{a_i}=i, \text{ when } 1<i\leq K \text{ and } a_i \in A. \quad (4)$$

$$I_{a_{i-K}^c}=i, \text{ when } N\geq i>K \text{ and } a_{i-K}^c \in A^c. \quad (5)$$

where $I_j$ is the index of the output bit from the interleaver 720, when j is the index of the input bit (to be interleaved to $I_j$) to the interleaver 720. A is the set of unfrozen input bit indices.

The polar encoder 710 may output the same bit value, as the input bit with the same index, when the polar encoder 720 is a systematic polar coder. The number of elements in A is K. $a_i$ is the element of A. $A^c$ may be the set of frozen input bit indices. The polar encoder 720 may output the parity bits. $a_{i-K}^c$ may be an element of $A^c$. The number of elements in $A^c$ may be N−K. The starting bit in the circular buffer 740 may be K+1. The number of bits to be transmitted in the second transmission may be N−K for a full parity transmission.

$I_{a_i}=i$ or $I_{a_{i-K}^c}=i$ may be an interleaver 720 (e.g., a simple interleaver) as the interleaver 720 follows the natural order within each group of unfrozen and frozen bits and unfrozen and frozen bits may be shuffled within a group (e.g., each group), as an extension, for example, $I_{a_i}=\text{pattern}(i)$ or $I_{a_{i-K}^c}=\text{pattern}(i)$ and pattern(i) may be random sequence composed of not duplicated integers between one and a maximum value.

After the second transmission, the retransmitted bits may be selected in a circular manner. The third transmission may start after a last index of the first transmission.

The interleaver, bit selection and circular buffer operations/procedures/functions/modules 720, 730 and 740 in combination may implement the function of rate matching in addition to or in lieu of the above selection of retransmitted bits.

The same interleaver 720 may be used for transmissions (e.g., all transmissions) but a different interleaver may be configured transmission-by-transmission. For example, the natural interleaver may be used after the second transmission.

Representative Operations for Option 2

Option 2 may be configured based on the same circular buffer structure 740 as set forth in Option 1. In Option 2, the bits saved/stored in the circular buffer 740 may be the coded bits after shortening (e.g., all of the coded bits may not be stored in the circular buffer structure due to the shortening operation). For example, the shortened bits may not be delivered/provided to the circular buffer 740 and may not be saved/stored. In Option 1, since there are no shortened bits (e.g., no shortening operation) and the bit selection process/operation does not exclude any bits from the output of polar encoder 710, all of the bits may be delivered to the circular buffer 740. For Option 2, a size of the circular buffer 740 may be N−S when S is the shortening number. In a circular manner as previously described, the first bit index is selected after the (N−S)-th index. Based on the circular buffer structure as shown in FIGS. 7A and 7B, an arbitrary number of repeated bits in the circular buffer 740 may be selected for one or more retransmissions.

Considering decoding complexity and performance trade-offs in the receiver 102/180, a full copy (or part) of the 1st transmitted block may be transmitted, as one or more retransmissions, for example, for chase combining. The received symbols in the receiver 102/180 may be combined (e.g., easily combined) together (e.g., all together) in demodulation level (e.g., in a demodulation operation) and no or only a minor amount of computational complexity may be additionally used and/or required for retransmissions in comparison to the first transmission.

Although one circular buffer is shown, more than one circular buffer may be implemented. For example, a first circular buffer may be used for storage of the shortened polar code block and a second circular buffer may be used for storage of the MCB itself. In some examples, further versions of the MCB or the polar code block may be stored in one or more further circular buffers. In certain embodiments, the one or more circular buffers may be included in a buffer circuit/hardware, a buffer unit and/or buffer module.

FIG. 8 is a diagram illustrating the representative options (e.g., Option 1 and Option 2) used in the second transmission. Selection of one of the two options (e.g., Option 1 and Option 2) may be evaluated in terms of Block Error Ratio (BLER). FIG. 8 illustrates both options in case a second transmission (e.g. 1$^{st}$ retransmission) is used/necessary (e.g., a NACK message is received). The coded bits after the polar encoder 710 may be divided into two categories, systematic bits and parity bits. The parity bits before shortening may be defined as "Parity A" and the parity bits after shortening may be defined as "Parity B." Parity A may be and/or is different from Parity B in terms of number of bits, positions and/or values. The systematic bits may be preserved after shortening. For Option 1, in the second transmission, Parity A (N−K bits) may be transmitted in the case of Option 1. For Option 2, the repeated bits (also with size of N−K bits) in the circular buffer 740, which may include Parity B or systematic bits may be transmitted.

FIG. 9 is a graph illustrating example BLER performances for Options 1 and 2 in the second transmission using various shortening numbers (e.g., shortening levels) (e.g., S=16, 32, 64, 96, 128, or 192).

Referring to FIG. 9, the graph shows the BLER level vs the ratio for transmitted signal energy per bit to noise spectrum density (e.g., a measure of normalized Signal-to-Noise Ratio (SNR)). Option 1, as disclosed herein, generally relates to transmission of the MCB for $2^{nd}$ and/or subsequent transmissions. Option 2, as disclosed herein, generally relates to transmission of a shortened MCB or a shortened polar code block for $2^{nd}$ and/or subsequent transmissions. In general, for a particular the normalized SNR (1), a BLER level associated with a $2^{nd}$ transmission of a shortened MCB or a second shortened polar code block with low shortening numbers (e.g., 16, 32 and 64) is lower (e.g., better) than the BLER level associated with a $2^{nd}$ transmission of a MOB; and (2) the BLER level associated with a $2^{nd}$ transmission of the shortened MCB or shortened polar code block with high shortening numbers (e.g., 128 and 192) is higher (e.g., worst) than the BLER associated with a $2^{nd}$ transmission of a MCB. In certain representative embodiments, for example, for an intermediate (e.g., medium) shortening number (e.g., 64, 96 and/or 128) the block (e.g., the shortened polar code block) selected via Option 1 or Option 2 may be further based on a target BLER level to be achieved.

FIG. 10 is a graph illustrating example BLER performances for high code rates for Options 1 and 2 in the second transmission using various shortening levels (e.g., S=8, 16, 24, 32, 48 or 128). In this disclosure, the simulation conditions associated with FIGS. 9-16, 18 and 21 are based on parameters in Table 1, as follows.

TABLE 1

Assumption of simulations

| N | 1024 |
|---|---|
| code type | systematic |
| code construction | NR sequence |
| shortening | NR shortening |
| CRC | 24 bit NR (included in K) |
| channel | AWGN |
| modulation | QPSK |
| minimum error count | 100 |
| decoding method | CASCL (L = 8) |

Referring to FIG. 10, for the high code rate example, the graph shows the BLER level vs the ratio for transmitted signal energy per bit to noise spectrum density (e.g., a measure of normalized Signal-to-Noise Ratio (SNR)). Option 1, as disclosed herein, generally relates to transmission of the MCB for $2^{nd}$ and/or subsequent transmissions. Option 2, as disclosed herein, generally relates to transmission of a shortened MCB or the shortened polar code block for $2^{nd}$ and/or subsequent transmissions. In general, for a particular normalized SNR: (1) the BLER level associated with a $2^{nd}$ transmission of the shortened MCB or the shortened polar code block with low shortening numbers (e.g., 8 and/or 16) is lower (e.g., better) than the BLER associated with a $2^{nd}$ transmission of a MCB; and (2) the BLER level associated with a $2^{nd}$ transmission of the shortened MCB or the shortened polar code block with high shortening numbers (e.g., 32, 48 and/or 128) is higher (e.g., worst) than the BLER associated with a $2^{nd}$ transmission of a MCB. In certain representative embodiments, for example, for an intermediate (e.g., medium) shortening number (e.g., 16, 24 and/or 32) the block (e.g., the MCB, the shortened polar code block or the shortened MCB) selected via Option 1 or Option 2 may be further based on a target BLER level to be achieved.

For example, polar codes may follow the same generation method as Arikan's original polar code and may include a bit reversal interleaver. The code construction operation may be based on NR sequence based code construction. In certain examples, the applied shortening operation may follow the conventional 3GPP NR shortening operation. When the shortening number S is small, the shortening operation may be the same as shortening in bit reversal order from the ending index. Serial repetition from the starting index is contemplated. The repetition may be done after shortening, when there is shortening.

For both Options 1 and 2, K=512 may be used. In the $1^{st}$ transmission, S bits are shortened and $$R = \frac{512}{1024 - S}.$$

For Option 1: The arbitrary N−S bits (e.g., with S=2, 16, 32, . . . ) in the $1^{st}$ transmission and N−K=512 parity bits of coded bits without shortening (e.g., prior to a shortening operation) may be retransmitted as the $2^{nd}$ transmission. The parity bits of the $1^{st}$ transmission (N−K−S bits generated by shortening) may not be used in the decoding of $2^{nd}$ transmission. It is equivalent to full coded bits without shortening in the decoding of the $2^{nd}$ transmission for every S value (e.g., all S values).

For Option 2: The arbitrary N−S bits (e.g., with S=16, 32, . . . ) in the $1^{st}$ transmission and the same number of transmitted bits as in Option 1 may be retransmitted in the $2^{nd}$ transmission. 512 bits of the $1^{st}$ transmission may be repeated as the $2^{nd}$ transmission and these bits may be combined with the $1^{st}$ transmitted bits for decoding. The bits used for decoding in the $2^{nd}$ transmission for Option 2 may be larger than in Option 1 because Option 2 may use the parity bits of the $1^{st}$ transmission.

Referring to FIG. 9, Option 2 with S=32 shows better performance than Option 1 at a BLER of $10^{-3}$ and Option 2 with S=64 shows slightly worse BLER performance than Option 1 at a BLER of $10^{-4}$. This may mean that retransmitting 512 parity bits (before shortening) can show better performance than repeating 512 bits when S >64.

Referring to FIG. 10, another example of a high code rate with K=768 and N−K=256 and 256 repeated bits are retransmitted in the $2^{nd}$ transmission of Option 2. In this example, Option 1 may be better than Option 2 in terms of error performance when S is larger than 24 for a target BLER of $10^{-3}$. For a higher code rate, the threshold value of S to show turnaround may be lower than for a lower code rate.

From the FIGS, it is contemplated that polar codes that are constructed without shortening, where the $2^{nd}$ transmission (e.g., the $1^{st}$ retransmission) is composed of parity bits can show better performance than the repetition of shortened bits depending on the initial code rate and the initial shortening number. This observation shows that the full code block without shortening can have better code properties (e.g., like minimum hamming distance) than the repeated bits of shortened code bits for some cases.

From the above observation, a HARQ mechanism that adaptively selects from the retransmission options depending on parameters may be implemented, for example as shown in FIG. 5. For example, in case of the first above example (see FIG. 9), when the shortening number is larger than 64, the parity of the mother polar code (without shortening and/or prior to a shortening operation) may be retransmitted in the $2^{nd}$ transmission for a target BLER of $10^{-3}$. The performance gain by Option 1 may become even bigger, when the shortening number increases.

Considering the slope of the BLER, when the target BLER is an order of $10^{-12}$, Option 1 may show (e.g., may always show) best performance than the shortened and repeated cases.

Representative Extensions of Option 1

When Option 2 is fixed, as the retransmission of the original shortened code bits, several extensions may be implemented after the $2^{nd}$ transmission. The total number of transmitted bits until the k-th transmission by Option 2 is k·(N−S).

In the extensions (e.g., all of the extensions), the transmission of N−K parity bits (from the full code bits (e.g., all code bits) without shortening and/or prior to a shortening operation) is contemplated in the $2^{nd}$ transmission and all transmissions including Option 1 and Option 2 may be based on a circular manner (e.g., the use of a circular buffer), as previously described.

For certain representative embodiments (e.g., Option 1-1), in the second transmission of Option 1, N−K bits may be transmitted and a copy of the full code block before shortening may be transmitted starting from the $3^{rd}$ transmissions.

For certain representative embodiments (e.g., Option 1-2), in the second transmission of Option 1, N−K bits may be transmitted.

In the second transmission of Option 2, the number of total transmitted bits may be 2·(N−S) bits. In Option 1, 2·(N−S)−((N−S)+(N−K))=K−S bits may be transmitted in the third transmission. By doing this, the number of total transmitted bits of Option 2 until the second transmission may be the same as in Option 1 until the third transmission (e.g., =2·(N−S)). In the fourth transmission of Option 1, N−(K−S) bits may be transmitted to have N bits by the third and fourth transmission and a copy of the full code block before shortening may be transmitted for the later transmissions.

For certain representative embodiments (e.g., Option 1-3), in the second transmission of Option 1, N−K bits may be transmitted. In the second transmission of Option 2, the number of total transmitted bits may be 2·(N−S) bits. In Option 1, 2·(N−((N−+(N−K))=K−S bits may be transmitted in the third transmission. N−S bits in the circular buffer may be transmitted for the fourth transmission.

Some numerical results may be provided for comparison of extensions with Option 2. The parameters for the initial transmission may be N=1024, K=768, S=128, M=N−S=896, and R=(768−24)/896=0.867≅⅞. The maximum number of transmissions may be 4.

FIG. 11 is a graph illustrating BLER performances for Options 1-1 and 2 in various transmission (e.g., $1^{st}$ transmission through $5^{th}$ transmission. Referring to FIG. 11, the graph shows BLER levels vs normalized SNR for various Options. For example, the graph shows the BLER performance of Option 2 (chase combining) and Option 1-1 and Table 2 set forth below summarizes the details of the various transmissions.

TABLE 2

Details of FIG. 11

| | Tx bits | Total Tx bits | Note |
|---|---|---|---|
| $1^{st}$ Tx | 0 | 896 | The first transmission |
| option 2, $2^{nd}$ Tx | 896 | 1792 | Copy of $1^{st}$ Tx |

TABLE 2-continued

Details of FIG. 11

| | Tx bits | Total Tx bits | Note |
|---|---|---|---|
| option 2, $3^{rd}$ Tx | 896 | 2688 | Copy of $1^{st}$ Tx |
| option 2, $4^{th}$ Tx | 896 | 3584 | Copy of $1^{st}$ Tx |
| option 2, $5^{th}$ Tx | 896 | 4480 | Copy of $1^{st}$ Tx |
| option 1-1, $2^{nd}$ Tx | 256 | 1152 | Copy of parity bits in full code block before shortening |
| option 1-1, $3^{rd}$ Tx | 1024 | 2176 | Copy of full code block before shortening |
| option 1-1, $4^{th}$ Tx | 1024 | 3200 | Copy of full code block before shortening |
| option 1-1, $5^{th}$ Tx | 1024 | 4224 | Copy of full code block before shortening |

FIG. 12 is a graph illustrating a throughput efficiency comparison between Option 1-1 and 2. Referring to FIG. 12, the graph shows throughput efficiency vs normalized SNR and may be calculated based on Equation 6 as follows:

$$\eta = \frac{E\{d_t\}}{E\{s_t\}} \qquad (6)$$

$d_t$ may be defined as the number of successfully decoded bits in the t th transmission, and $s_t$ may be defined as the total number of transmitted bits in the transmitter. E{ } stands for expectation value. When $A_t$ is an event of failed decoding in the t th transmission and t∈ [1m+1], the following Approximations 7 and 8 may be set forth, as follows:

$$E\{d_t\} \approx (K-C) \cdot [1 - Pr(A_{m+1})] \qquad (7)$$

$$E\{s_t\} \approx \Sigma_{i=1}^{m+1} \Sigma_{i=1}^{t} M_i \cdot [Pr(A_{t-1}) - Pr(A_t)] + \Sigma_{t=1}^{m+1} M_t \cdot Pr(A_{m+1}) \qquad (8)$$

where C is the number of CRC bits included in the K information bits. $Pr(A_t)$ stands for the probability of event $A_t$ and may correspond to a BLER of t th transmission. $Pr(A_t)$ may be expressed by $Pr(A_t)=BLER_t$ when $BLER_t$ is the BLER of t th transmission. $M_t$ stands for the number of transmitted bits in the t th transmission.

In FIG. 12, Option 1-1 may show some advantage in high and low SNR regions. (maximum ~2.5 dB in high SNR and maximum ~1.5 dB in low SNR). In a medium SNR region, corresponding to the $2^{nd}$ transmission, Option 2 may be better than Option 1-1, for example because Option 2 may have the benefit of full repetition of the $1^{st}$ transmission (shortened) although Option 2 may be configured as a full code block without repetition in the $2^{nd}$ transmission. To improve Option 2, the $2^{nd}$ transmission of Option 2 may be changed/modified as set forth in Table 3.

TABLE 3

Details of FIG. 13

| | Tx bits | Total Tx bits | Note |
|---|---|---|---|
| $1^{st}$ Tx | 0 | 896 | The first transmission |
| option 2, $2^{nd}$ Tx | 896 | 1792 | Copy of $1^{st}$ Tx |
| option 2, $3^{rd}$ Tx | 896 | 2688 | Copy of $1^{st}$ Tx |
| option 2, $4^{th}$ Tx | 896 | 3584 | Copy of $1^{st}$ Tx |
| option 2, $5^{th}$ Tx | 896 | 4480 | Copy of $1^{st}$ Tx |
| option 1-2, $2^{nd}$ Tx | 256 | 1152 | Copy of parity bits before shortening |
| option 1-2, $3^{rd}$ Tx | 640 | 1792 | To have the same number of total bits as option 2 for throughput balance Part of full code block |

TABLE 3-continued

Details of FIG. 13

| | Tx bits | Total Tx bits | Note |
|---|---|---|---|
| option 1-2, 4$^{th}$ Tx | 384 | 2176 | before shortening (Same number as the option 2 2$^{nd}$ Tx) Remaining bits omitting bits of 3$^{rd}$ Tx in full code block before shortening |
| option 1-2, 5$^{th}$ Tx | 1024 | 3200 | Copy of full code block before shortening |

FIG. 13 is a graph illustrating representative BLER comparisons between Option 1-2 and Option 2. Referring to FIG. 13, the graph shows BLER levels vs normalized SNR for various Options (e.g., Options 1-2 and 2).

FIG. 14 is a graph illustrating throughput efficiency vs normalized SNR with comparisons between Option 1-2 and Option 2. Option 1-2 may correspond to the modification/change of the 3rd Tx from Option 1. In FIG. 13, the gain in low SNR of FIG. 12 is not shown. FIG. 15 is a graph illustrating BLER performance comparisons between Option 1-3 and Option 2. Referring to FIG. 15, the graph shows BLER levels vs normalized SNR for various Options (e.g., Options 1-3 and 2). FIG. 16 is a graph illustrating a throughput efficiency vs normalized SNR with comparison between Option 1-3 and Option 2. Option 1-3 relates to when the number of transmitted bits in the 4th and 5th transmissions are increased by the repetition (e.g., as set forth in Option 1-3 and Table 4 below).

TABLE 4

Details of FIG. 15

| | Tx bits | Total Tx bits | Note |
|---|---|---|---|
| 1$^{st}$ Tx | 0 | 896 | The first transmission |
| option 2, 2$^{nd}$ Tx | 896 | 1792 | Copy of 1$^{st}$ Tx |
| option 2, 3$^{rd}$ Tx | 896 | 2688 | Copy of 1$^{st}$ Tx |
| option 2, 4$^{th}$ Tx | 896 | 3584 | Copy of 1$^{st}$ Tx |
| option 2, 5$^{th}$ Tx | 896 | 4480 | Copy of 1$^{st}$ Tx |
| option 1-3, 2$^{nd}$ Tx | 256 | 1152 | Copy of parity bits before shortening |
| option 1-3, 3$^{rd}$ Tx | 640 | 1792 | To have the same number of total bits as option 2 for throughput balance Part of full code block before shortening (Same number as the option 2 2$^{nd}$ Tx) |
| option 1-3, 4$^{th}$ Tx | 896 | 2688 | To have the same number of total bits as option 2 for throughput balance Part of full code block before shortening (Same number as the option 2 3$^{rd}$ Tx) |
| option 1-3, 5$^{th}$ Tx | 896 | 3584 | To have the same number of total bits as option 2 for throughput balance Part of full code block before shortening (Same number as the option 2 4$^{th}$ Tx) |

Representative HARQ Operation by Small Block Retransmission

In certain representative embodiments, procedures/operations to determine a subset of unfrozen bits for the second transmission (1$^{st}$ retransmission) according to a critical set of the first transmission may be implemented. The first and the second transmission bits may be concatenated serially and may be saved/stored in a buffer. The retransmitted bits after the second transmission (e.g., a third transmission and/or a fourth transmission, among others) may be selected in a circular manner from a circular buffer structure.

The unfrozen bits in the second transmission may be the zero-th level critical set (e.g., more critical) or may be a subset of a union among critical sets with different levels. The overall decoding may be done (e.g., completed) by the parallel combination of one decoding procedure/operation for the first transmission and another decoding procedure/operation for the second transmission.

Some repetitive part of the first transmission and some repetitive part of the second transmission may be received after the second transmission (e.g., the third transmission, the fourth transmission, among others) and may be combined with previously received symbols in LLR calculations.

The LLR values for a part of the unfrozen bits in the first decoding may be exchanged with the LLR values of unfrozen bits in the second decoding. Exchanging of the LLR values may be done (e.g., completed) for certain iterations (e.g., each iteration and/or each half iteration), for example in a case of belief propagation decoding.

FIG. 17 is a diagram illustrating a representative transmitter structure for HARQ operations. Referring to FIG. 17, a HARQ scheme may be described as or may include the operations in the diagram illustrated in FIG. 17. The transmitter structure 1300 may include any of: one or more polar encoders 1310a, one or more interleavers 1320a, one or more bit selectors 1330a and/or one or more circular buffers 1340. The same or a different polar encoder 1310, interleaver 1320, and/or bit selector 1330 may be used for the first and second transmissions.

After the first transmission, the transmitter 102/180 may wait for a response from a receiver 102/180. The receiver 102/180 may send a NACK signal to the transmitter 102/180 if there is an error in decoding of received signals. The receiver 102/180 may use a CRC for error detection. When the transmitter 102/180 receives and identifies a NACK signal, the transmitter 102/180 may send a small polar coded block in the second transmission using the polar encoder 1310, interleaver 1320, and/or bit selector 1330 may be used for the first and second transmissions. The length of the small polar coded block may be smaller than the length of the first transmission. The interleaver 1320 and bit selector 1330 in FIG. 17 may be the same module/unit as other interleaver and bit selection blocks described herein.

Representative Small (and/or Supplemental) Polar Coded Block for the Second Transmission A small polar coded block (e.g., below a threshold size) may be configured by polar encoding from the unfrozen bits in the first transmission. The length of the small coded block may not or is not larger than the length of the first transmission N and the decoding complexity may be smaller than the decoding complexity of the first transmission. The length of the small coded block may be determined by the allowable amount of additional complexity to the maximum code block length in the decoder implementation, for example which may provide a trade-off between improved error performance in the retransmission and an increased complexity or area efficiency.

Some of the bits in least reliable positions in the first transmission may be selected as unfrozen bits. Identification of the least reliable positions (and/or indices) may be done/completed by a sequence showing a reliability value of the indices (e.g., each index) and/or a sequence showing the index of ordered reliability.

The small polar coded block may or may not be Cyclic Redundancy Check (CRC) attached. When the CRC is attached, the CRC may be additional to the part of unfrozen bits selected in the first transmission.

The number of selected least reliable bits may be derived/set depending on the code rate of the first transmission and the allowable coded block length of the small block. The number of selected least reliable bits or the code rate of the small coded block may be selected to confirm the performance of the small block, for example to show improvement in the decoding process of the retransmissions.

Representative Critical Set Retransmissions for Small Coded Block in the Second Transmission The critical set of the unfrozen bits in the first transmission can be selected as unfrozen bits in the small coded block in the second transmission.

In one example, the critical set may be acquired, for example by a critical set determination procedure/operation in which:

```
For b = n to c with decrement 1
    For a = 1 to N with increment 2^b
        If all bits with indices from i = a to a + 2^b − 1 are unfrozen bits
        in the first transmission and not selected as critical set previously,
            bit indices i = a is selected as one element of critical set of
            level 0
        Endif
    Endfor(a)
Endfor(b),
```

The first set acquired from the above procedure/operation may be defined as the critical set of level 0. After a determination of the critical set of level 0, the above procedure/operation may be repeated and the critical set of the next level (=1 level) may be acquired and the critical set of the further levels may also be acquired by the same repetition. In the above procedure/operation that is repeated, the previously selected index, as the critical set in the previous level, is counted as frozen bits.

The critical set of levels (e.g., of different levels) may be combined into a larger critical set and the larger critical set may be selected as unfrozen bits in the second and/or further transmissions. A part of a critical set of combined critical set may be selected as unfrozen bits in the second and/or further transmissions. A simple example may be the critical set at level 0 selected for unfrozen bits in the second transmission.

Representative Further Transmissions after the Second Transmission

The transmitted bits in the first and second transmissions (e.g., small coded block transmissions) may be combined serially and saved/stored in the buffer 740 and 1340 (e.g., the circular buffer structure). The buffer may be used for further retransmissions after the second transmission. The starting bit index to be transmitted in the third transmission may be 1.

Representative Belief Propagation Decoding

In decoding of retransmissions, one or more small polar coded blocks may be used in connection with the received block of the first transmission, which, for example may introduce additional latency in case of SC-based decoding with additional complexity. The increase in latency may not be favorable in terms of the HARQ timing and low latency communication. The belief propagation decoding for polar codes may provide some benefits.

A message passing algorithm of belief propagation may be described as set forth in Equations 9-12, as follows (where i represents the bit index and j represents the stage number (following the same representation as in the FIG. 2).

$$L_{i,j}=G(L_{i,j+1},L_{i+2^j,j+1}R_{i+2^j,j}) \quad (9)$$

$$L_{i+2^j,j}=G(R_{i,j},L_{i,j+1})+L_{i+2^j,j+1} \quad (10)$$

$$R_{i,j+1}=G(R_{i,j},L_{i+2^j,j+1}R_{i+2^j,j}) \quad (11)$$

$$R_{i+2^j,j+1}=G(R_{i,j},L_{i,j+1})+R_{i+2^j,j} \quad (12)$$

where $G(x,y)=\text{sgn}(x)\text{sgn}(y)\min(|x|,|y|)$ and $\text{sgn}(x)$ is a sign value of x. When $x \geq 0$, $\text{sgn}(x)=1$ and when $x<0$, $\text{sgn}(x)=-1$. $|x|$ is the absolute value of x.

One scheduling procedure/operation in belief propagation decoding for polar codes may be "round robin". One of skill may start from the right side in the FIG. 2 (j=n) and proceed to the left (j=0) by calculating Equation 9 and 10 for all i in the round robin scheduling. After that, the scheduling procedure/operation may end one iteration by calculating Equation 11 and 12 from the left (j=0) to the right (j=n) for all i.

For both the one or more small coded blocks and the first transmitted block, the belief propagation decoding may be done in parallel and there may be a small increase in iterations for early stopping in comparison to decoding the first transmitted block (e.g., only the first transmitted block). Before decoding after the third retransmissions, the repeated bits for the first transmission (e.g., all of the repeated bits for the first transmission) may be combined based on one or more chase combining rules and the repeated bits (e.g., all of the repeated bits) for the small coded block may be combined based on the chase combining rules. When the unfrozen bit with index i in the first transmission has the same bit value as the unfrozen bit with index i' in the small coded block, in stage 0, the LLR values may be exchanged between i and i' for every iteration (or half iteration) of belief propagation decoding.

$$R_{i,0}^{1st}=L_{i',0}^{small} \quad (13)$$

$$R_{i',0}^{small}=L_{i,0}^{1st} \quad (14)$$

The above Equations 13 and 14 showing exchange of LLR values may be derived using the concept that the same value of two nodes may be modeled as one check node connected with two different variable nodes. "Small" represents the small coded block retransmission and "$1^{st}$" represents the first transmission.

Exchange of LLR values may be done/completed for every half iteration after finishing the calculation of Equation 9 and 10.

Because the small coded block may have smaller stages than the first transmission, the BP decoder for the small coded block may wait for a finish of the BP decoding of the first transmission based on the timing unit of a half iteration or a full iteration.

FIG. 18 is a graph illustrating BLER performance comparisons between or among schemes for $2^{nd}$ transmission (Tx). In FIG. 18, the BLER comparison between least reliable unfrozen bit transmission and critical set transmission in the second transmission is shown. 119 critical elements in level 0 are retransmitted and the same number of least reliable bits are retransmitted in the second transmission for comparison. The simulation conditions are summarized as in Table 5 as follows. In FIG. 18, the critical set retransmission shows a coding of ~0.25 dB at a BLER of $10^{-4}$.

TABLE 5

| Simulation Conditions | |
| --- | --- |
| N | 1024 |
| K | 512 |
| N for small block | 256 |
| K for small block | 119 |

TABLE 5-continued

| Simulation Conditions | |
| --- | --- |
| code type | Non-systematic |
| code construction | NR sequence |
| CRC | No CRC bit |
| channel | AWGN |
| modulation | QPSK |
| minimum error count | 100 |
| decoding method | BP round robin |
| Maximum iteration | 60 |

Representative HARQ Operation by KE for Systematic Polar Codes

In certain representative embodiments, when a systematic polar encoder is configured by cascading two non-systematic polar encoders (e.g., with a second non-systematic encoder after a first non-systematic encoder), the first half coded bits are the (m+1)-th transmitted bits and the second half coded bits are the m-th transmitted bits in a HARQ process.

Part of the input bits entering the second non-systematic encoder in the m-th transmission may be copied to the input bits entering the second encoder in the (m+1)-th transmission.

Part of the input bits entering the second non-systematic encoder in the m-th transmission, which may be copied, may be processed as frozen bits in the decoding of the full polar code.

Part of the input bits entering the second non-systematic encoder in the (m+1)-th transmission, which may be copied, may be processed as unfrozen bits in the decoding of full polar code and may be used as corresponding frozen values of the original bits (which may be considered as frozen bits) in SC based decoding.

The copied and to be copied bits (e.g., copying bits) may exchange LLR values in BP based decoding for iterations (e.g., each iteration and/or half iteration). The procedure/operation may be applicable both for systematic and non-systematic polar codes.

In a first transmission, a block length of the MCB may be $N=2^n$ and the block length of the second transmission may be the same length ($=2^n$). In a receiver side, the code blocks in the first transmission and the second transmission may be combined and the blocks may be considered as the extended code with a length of $2N=2^{n+1}$. When there is a m-th transmission, the extended code with a length of $l_m=2^{n+m-1}$ may be considered in the receiver side by combining previously received blocks (e.g., all of the previously received blocks).

$A_m$ may be defined as the set of unfrozen indices of extended polar code after the m-th transmission and $A_m^c$ may denote the set of unfrozen indices of extended polar code after the m-th transmission. The size of $A_m$ may also be defined as $|A_m|$ and may be $|A_m|=K$. $A_m$ may be set forth in Equation 15 as follows:

$$A_m = \{a_{m,0}, a_{m,1}, \ldots, a_{m,K-1}\} \quad (15)$$

where $A_m$ may be the most reliable K indices in the code construction of polar codes with a MCB length of $l_m = 2^{n+m-1}$.

The length of transmitted coded bits (e.g., before rate-matching) in the m-th transmission may be defined as $l_m - l_{m-1} = 2^{n+m-1} - 2^{n+m-2} = 2^{n+m-2} = N \cdot 2^{m-2}$.

In the m-th transmission, the elements having index not more than $N-2^{m-2}$ in $A_m$ may be indices of bits which may have the copied values of previously ((m-1)-th) transmitted unfrozen bits and the $B_m$ may be composed of these unfrozen bits. $B_m$ may be set forth in Equation 16 as follows:

$$B_m = \{x | x \in A_m \text{ and } x > N \cdot 2^{m-2}\}. \quad (16)$$

$C_m$ may be a set composed of indices of bits which may be copied to the m-th transmission as unfrozen bits and may be considered as frozen bits. The elements of $A'_{m-1}$ may be acquired by adding $2^{m-2}$ to elements (e.g., all elements) of $A_{m-1}$. $A'_{m-1}$ may mean that the polar code in the (m-1)-th transmission is one of component polar code in m-th transmission and adding $2^{m-2}$ to match the index of unfrozen bits between the m-th transmission and the (m-1)-th transmission. $A'_{m-1}$ and $C_m$ may be set forth in Equations 17 and 18 as follows:

$$A'_{m-1} = \{y | x \in A_{m-1} \text{ and } y = x + 2^{m-2}\} \quad (17)$$

$$C_m = \{y | x \in A_m \cap A'_{m-1} \text{ and } y = x - 2^{m-2}\}. \quad (18)$$

The numbers of $B_m$ and $C_m$ may be the same and $|B_m|=|C_m|$. For example, when n=3, N=8 and K=4, $A_1=\{4, 6, 7, 8\}$ and $A_2=\{8, 14, 15, 16\}$. $B_2=\{4\}$ in $A_1$ may be copied to $\{8\}$ and may be considered as frozen bits in decoding. $C_2 = A_2^c \cap A'_1 = \{1, 2, 3, 4, 5, 6, 7, 9, 10, 11, 12, 13\} \cap \{4+8, 6+8, 7+8, 8+8\} = \{4+8\}$. $\{4+8=12\}$ may correspond to $\{4\}$ in the first transmission. $\{8\}$ may be the only index not more than N in $A_2$.

FIG. 19 is a diagram illustrating a HARQ $2^{nd}$ transmission implementation by KE for a systematic polar code.

Referring to FIG. 19, the HARQ $2^{nd}$ transmission implementation 1900 may include first and second non-systematic polar encoders 1910 and 1920. The input bits to the first non-systematic polar encoder 1910 may include bits 1930 associated with a first transmission and bits 1940 associated with a second transmission. The bits 1930 associated with the first transmission may include (1) frozen bits 1930A of the first transmission and unfrozen bits 1930B of the first transmission. A part 1930C of the unfrozen bits 1930B of the first transmission may be copied, as copied bits 1940A, to the second transmission. The bits 1940 associated with the second transmission may include the copied bits 1940A and frozen bits 1940B. The output of the first non-systematic encoder 1910 may be input to a zero set unit/module 1950. The zero set module 1950 may set the frozen indices to zero (or another value (e.g., another default value)). The output of the zero set unit/module 1950 may include parity X (e.g., coded bits that correspond to the copied bits) and parity Y (e.g., coded bits that correspond to the original bits (e.g., the frozen or unfrozen bits 1930). The coded bits associated with the output of the zero set module 1950 including parity X and parity Y may be input to the second non-systematic polar encoder 1920. The output of the second non-systematic polar encoder 1920 may be a systematic coded bits.

For example, when the decoding operation/procedure is performed for the second transmission in combination with the first transmission, the coded bits (=parity X) (e.g., corresponding to the copied bits before the second non-systematic encoder) may be different from the coded bits (=parity Y) (e.g., corresponding to the original bits before the second non-systematic encoder). In decoding the HARQ by KE, the original bits in the first transmission and the copied bits in the second transmission may be the same, for example because the original bits in the first transmission may be handled as frozen bits and the decoding process cannot or may not be finished properly if the original bits are not known before decoding them.

FIG. 20 is a diagram illustrating a KE procedure for systematic polar codes.

Referring to FIG. 20, the coded bits from the second transmission of a HARQ (e.g., a polar coded HARQ) may be implemented, as shown in FIG. 19. The KE procedure 2000 may include, at block 2010, information bits being generated or obtained. At block 2020, the information bits may be polar encoded using a non-systematic polar encoder (e.g., non-systematic polar encoder 1910). At block 2030, frozen indices associated with the information bits are set to zero (e.g., or another default value). At block 2040, parity Y may be copied to parity X. The copying operation may be done/completed before the second non-systematic polar encoder 1920, instead of copying the parity bits before the first non-systematic encoder. Among the coded bits after the first non-systematic encoder, the ones having the same indices as the original information bits (to be copied) in the first transmission may be copied to the second transmission. In FIG. 19, Y may be copied to X.

As an extension, the parity bits before the second non-systematic encoder 1920 (e.g., corresponding to unfrozen bits (e.g., the original bits to be copied) of the extended polar code generated by the previous transmissions (e.g., all of the previous transmissions)) may be copied to the parity bits before the second non-systematic encoder 1920 (e.g., corresponding to unfrozen bits in the current transmission). By this operation/procedure, the systematic bits in the second transmission may not or does not exist and parity bits (e.g., only parity bits) may be found.

The part of input bits provided to the second non-systematic encoder 1920 in the (m+1)-th transmission, which may be copied, may be processed as unfrozen bits in the decoding of the full polar code and may be used as corresponding frozen values to the original bits (e.g., which may be considered as frozen bits) in SC based decoding.

In the HARQ by IF operation/procedure, a part of the unfrozen bits provided to the second encoder in the first transmission may be selected as unfrozen bits (e.g., all unfrozen bits) in the retransmissions when a systematic polar code is used. The selected unfrozen bits provided to the second encoder may be the least reliable bits in the first transmission. For the further retransmission, the previously transmitted unfrozen bits provided to the second encoder may be selected as unfrozen bits (e.g., all unfrozen bits) in the current transmission and the selected bits may be the least reliable bits when considering the combined code block (e.g., all of the combined code block) by the transmissions (e.g., all of the transmissions). In retransmissions, the first encoding operation/procedure for retransmissions may not require and/or use HARQ by KE.

The copied bits and to be copied bits (e.g., copying bits) may exchange LLR values in BP based decoding for iterations (e.g., each iteration and/or half iteration). Under the same decoding algorithm as Equation 9, 10, 11 and/or 12, the exchange may be expressed as Equations 19 and 20.

$$R_{i,0}^{copied} = L_{i',0}^{copying} \quad (19)$$

$$R_{i',0}^{copying} = L_{i,0}^{copied} \quad (20)$$

wherein "copied" stands for the bit which is to be copied and may correspond to index i. "copying" stands for the bit which may have the same value as the copied bits and may correspond to index i'.

FIG. 21 is a graph illustrating performance comparisons between BLERs for systematic and non-systematic polar HARQ by KE in the second transmission. FIG. 21 shows the BLER level vs normalized SNR. For a given normalized SNR, the BLER level is generally better for systematic polar encoding vs non-systematic polar encoding. The simulation conditions are set forth in Table 6, as follows:

TABLE 6

| Simulation Conditions | |
|---|---|
| N for $1^{st}$ Tx | 512 |
| K for $1^{st}$ Tx | 280 (including CRC) |
| N for $2^{nd}$ Tx | 512 |
| N for combined | 1024 |
| code type | Systematic |
| code construction | NR sequence |
| CRC | 24 CRC bit |
| Channel | AWGN |
| modulation | QPSK |
| minimum error count | 100 |
| decoding method | CASCL |

Although the features and elements of the present invention are described in the disclosed embodiments in particular combinations, each feature or element can be used alone without the other features and elements of the disclosed embodiments or in various combinations with or without other features and elements of the present invention.

Although the polar codes described herein are considered in conjunction with New Radio (NR), 5G or LTE, LTE-A specific, tera bit or tera Hz communication protocols, it is understood that the embodiments described herein are not restricted to these technologies/systems and may be equally applicable to other wireless systems.

In certain representative embodiments, two different options may be used for retransmissions. The selection of an option may depend on any of: a code rate, a target error rate and/or a number of shortened bits in a first transmission of systematic codes in a HARQ process.

In a first option, a MCB without shortening (e.g., and/or prior to a shortening operation) may be stored in a circular buffer after interleaving and the retransmitted bits may be selected in a circular manner from the circular buffer. In this option, parity bits may be prioritized and full parity bits may be transmitted in the second transmission. In a second option, a code block with shortening may be stored in a circular buffer after interleaving and bit selection. The retransmitted bits may be selected in a circular manner from the circular buffer.

In certain representative embodiments, a set based on the critical set among the unfrozen bits in the first transmission may be selected as unfrozen bits for the second transmission in HARQ operations/procedures. The transmitted bits in the first transmission and the second transmission may be concatenated serially and stored in a circular buffer. The retransmitted bits after the second transmission (e.g., the third transmission, the fourth transmission, among others) may be selected in a circular manner from the circular buffer. The unfrozen bits in the second transmission may be the zero-th level critical set or may be a subset of union among critical sets with different levels. The total decoding may be performed by one decoding operation/procedure for the first transmission and another decoding operation/procedure for the second transmission, for example in parallel.

Some repetitive parts of the first transmission and/or some repetitive parts of the second transmission may be received after the second transmission (e.g., in the third transmission, and/or the fourth transmission, among others) and may be combined with previously received symbols in LLR calculations.

The part of the LLR values of the unfrozen bits in the first decoding may be exchanged with the LLR values of the unfrozen bits in the second decoding. The exchanging of LLR values may be done/completed for iterations (e.g., each iteration and/or each half iteration) in case of BP decoding.

In certain representative embodiments, when a systematic polar encoder is configured by cascading two non-systematic polar encoders (e.g., using a second non-systematic encoder after a first non-systematic encoder), the first half coded bits may be the (m+1)-th transmitted bits and the second half coded bits may be the m-th transmitted bits in the HARQ process.

A part of the input bits provided to the second non-systematic encoder in the m-th transmission may be copied to a part of the input bits provided to the second encoder in the (m+1)-th transmission. The part of the input bits provided to the second non-systematic encoder in the m-th transmission, which may be copied, may be processed as frozen bits in decoding of the full polar code. The part of input bits to the second non-systematic encoder in the (m+1)-th transmission which is copied may be processed as unfrozen bits in decoding of the full polar code and can be used as corresponding frozen values to the original bits (which is considered as frozen bits) in SC based decoding. The copied and copying bits may exchange LLR values in the BP based decoding for iterations (e.g., each iteration or half iteration).

When referring to a Transmitting Node (TN) and a Receiving Node (RN) herein, (for example with respect to FIGS. 22-29, the TN may be any of: a WTRU 102 or an Access Point (AP) 180, for example. The TN 102/180 may be in communication with the Receiving Node (RN). The RN may be: (1) the other one of the WTRU 102 or the AP 180 for WTRU-to-AP communication, (2) another WTRU 102 for WTRU-to-WTRU communication, or (3) another AP 180 for AP-to-AP communication.

FIG. 22 is a flowchart illustrating a representative procedure implemented by a Transmitting Node (TN).

Referring to FIG. 22, the representative procedure 2200 may include, at block 2210, the TN 102/180 generating a first set of polar coded bits (PCBs), for example, by applying a shortening operation in a polar encoding operation to a polar code block (e.g., a polar code block encoded from input bits and/or a mother code block (MCB)). At block 2220, the TN 102/180 may send the first set of PCBs or an interleaved copy of the first set of PCBs in a first transmission. At block 2230, the TN 102/108 may select one code generating operation of a plurality of code generating operations based on at least a number of shortened bits associated with the shortening operation. At block 2240, the TN 102/180 may store in a circular buffer 740 a second set of PCBs based on the first set of PCBs or based on the MCB in accordance with the selected code generating operation. At block 2250, on condition that the first transmission was not successful, the TN 102/180 may output, from the circular buffer 740, a copy of a part of the second set of PCBs for transmission. At block 2260, the TN 102/180 may send the copy of the second set of PCBs in a second transmission.

In certain representative embodiments, the circular buffer 740 may store and/or include one of: (1) PCBs associated with the MCB without or prior to the shortening operation, on condition that the number of shortened bits exceeds a threshold; and/or (2) PCBs associated with the shortening operation, on condition that the number of shortened bits does not exceed the threshold.

In certain representative embodiments, the TN 102/180 may determine indices associated with a set of parity bits in the MCB, may select, from the circular buffer 740 based on the determined indices, the set of parity bits in the MCB for inclusion in the copy of the part of the second set of PCBs and/or may generate, the copy of the part of the second set of PCBs including the selected set of parity bits.

In certain representative embodiments, the TN 102/180 may group the selected set of parity bits together in a sequence, may group a set of systematic bits together in a sequence, and/or may interleave (e.g., via an interleaver) the grouped parity bits and the grouped systematic bits for to generate the copy of the part of the second set of PCBs.

In certain representative embodiments, the selection of one code generating operation of a plurality of code generating operations may be based on the number of shortened bits associated with the shortening operation and any of: (1) a code rate, and/or (2) a target error rate.

FIG. 23 is a flowchart illustrating another representative procedure implemented by a TN that uses a set of input bits.

Referring to FIG. 23, the representative procedure 2300 may include, at block 2310, the TN 102/180 may determine a shortening number (SN) associated with a shortening operation for generation of a first transmission. At block 2320, the TN 102/180 may generate from the set of input bits, a first set of polar coded bits (PCBs), the first set of PCBs to provide data or control information. At block 2330, the TN may send, by the TN 102/180 to a receiving node (RN) in the first transmission, the first set of PCBs shortened in accordance with the SN. At block 2340, on condition that the SN exceeds a threshold, the TN 102/180 may generate from a MCB associated with the set of input bits, a second set of PCBs. At block 2350, on condition that the SN does not exceed the threshold, the TN 102/180 may generate from a shortened polar code block associated with the set of input bits, the second set of PCBs. At block 2360, on condition that the SN does not exceed the threshold, the TN 102/180 may send to the RN 102/180, the generated second set of PCBs in a second transmission.

In certain representative embodiments, the TN 102/180 may receive from the RN 102/180, an acknowledgment (ACK) or a negative ACK (NACK) associated with the data or the control information. The generation of the second set of PCBs from the MCB associated with the set of input bits may include one of: (1) on condition that the received NACK is a first received NACK associated with the data or the control information, the TN 102/180 generating prioritized parity bits from the MCB associated with the set of input bits; or (2) on condition that the received NACK is not the first received NACK: the TN 102/180 selecting a subset of bits from the MCB associated with the set of input bits; and generating the second set of PCBs from the selected subset of bits.

In certain representative embodiments, the TN 102/180 may store, in a circular buffer 740, one of: (1) PCBs associated with the MCB without and/or prior to the shortening operation, on condition that the SN exceeds the threshold; and (2) PCBs associated with the shortening operation, on condition that the SN does not exceed the threshold such that the generation of the second set of PCBs uses the stored PCBs.

In certain representative embodiments, the first set of PCBs bits including a set of parity bits is one of: (1) the MCB or (2) the shortened polar code block.

In certain representative embodiments, the TN 102/180 may determine, from a received message or expiry of a timer, whether the first transmission was successful. For example, on condition that the first transmission was not successful, the TN 102/180 may determine indices associated with the set of parity bits in the MCB such that the generation of the second set of PCBs may include selecting, from the circular buffer 740, the set of parity bits in the MCB for inclusion in the second transmission based on the determined indices.

In certain representative embodiments, the TN 102/180 may group the set of parity bits together in a sequence, may group a set of systematic bits together in a sequence; and may interleave the grouped parity bits and the grouped systematic bits for the transmission in the second transmission or a subsequent transmission.

FIG. 24 is a flowchart illustrating a further representative procedure implemented by a TN using a set of input bits.

Referring to FIG. 24, the representative procedure 2400 may include, at block 2410, the TN 102/180 may generate from the set of input bits, a first set of polar coded bits (PCBs), the first set of PCBs including a set of parity bits associated with the first set of coded bits. At block 2420, the TN 102/180 may apply a shortening operation in a polar encoding process to generate a shortened polar code block. At block 2430, the TN 102/180 may send the shortened polar code block in a first transmission. At block 2440, the TN 102/180 may store in a circular buffer 740, the shortened polar code block. At block 2450, the TN 102/180 may generate or copy from the shortened polar code block stored in the circular buffer 740, a second set of PCBs. At block 2460, the TN 102/180 may send the second set of PCBs in a second transmission.

In certain representative embodiments, the TN 102/180 may store in the circular buffer 740, one of: (1) PCBs associated with the MCB, on condition that a shortening number exceeds a threshold; and/or (2) PCBs associated with the shortening operation, on condition that the shortening number does not exceed the threshold.

In certain representative embodiments, the shortened polar code block or the MCB may include parity bits and systematic bits and the TN 102/180 may group a set of the parity bits together in a sequence, may group a set of the systematic bits together in a sequence; and/or may interleave the grouped parity bits and the grouped systematic bits for transmission in the second transmission or in a subsequent transmission.

FIG. 25 is a flowchart illustrating an additional representative procedure implemented by a TN using a set of input bits.

Referring to FIG. 25, the representative procedure 2500 may include, at block 2510, the TN 102/180 generating from the set of input bits, a first set of polar coded bits (PCBs). At block 2520, the TN 102/180 may send the first set of PCBs in a first transmission. At block 2530, the TN 102/180 may select one code generating operation of a plurality of code generating operations based on any of: (1) a code rate, (2) a target error rate or (3) a number of shortened bits associated with the first transmission. At block 2540, the TN 102/180 may store in a circular buffer 740, a second set of PCBs in accordance with the selected code generating operation. At block 2550, on condition that the first transmission was not successful, the TN 102/180 may output from the circular buffer 740 a copy of the second set of PCBs or an interleaved copy of the second set of PCBs for transmission. At block 2560, the TN 102/180 may send the copy or the interleaved copy of the second set of PCBs in a second transmission.

In certain representative embodiments, the TN 102/180 may receive from a RN 102/180, an acknowledgment (ACK) or a negative ACK (NACK) associated with data or control information of the first transmission. For example, the selecting of the code generating operation may be further based on whether the NACK is a first NACK associated with the data or the control information.

In certain representative embodiments, the TN 102/180 may generate the second set of PCBs including prioritized parity bits from a MCB in accordance with a first code generating operation of the plurality of code generating operations.

In certain representative embodiments, the TN 102/180 may generate the second set of polar coded bits from the selected subset of PCBs of a MCB.

In certain representative embodiments, the TN 102/180 may generate the second set of polar coded bits from a shortened polar code block.

In certain representative embodiments, the first set of PCBs including a set of parity bits may be one of: (1) a MCB; or (2) a shortened polar code block.

In certain representative embodiments, the TN 102/180 may group the set of parity bits together in a sequence, may group a set of systematic bits together in a sequence, and/or may interleave the grouped parity bits and the grouped systematic bits for the transmission in the second transmission or a subsequent transmission.

In certain representative embodiments, the TN 102/180 may send a portion of the PCBs stored in the circular buffer 740 for further transmissions after the second transmission.

FIG. 26 is a flowchart illustrating a representative procedure implemented by a Receiving Node (RN).

Referring to FIG. 26, the representative procedure 2600 may include, at block 2610, the RN 102/180 receiving a first transmission including a first set of polar coded bits (PCBs) and a second transmission including a second set of PCBs comprising a set of parity bits. At block 2620, the RN 102/180 may combine the first and second sets of polar coded bits. At block 2630, the RN 102/180 may decode the combined first and second sets of PCBs. At block 2640, the RN 102/180 may determine whether the first transmission and/or the second transmission are successfully received, as a determined result. At block 2650, the RN 102/180 may send an acknowledgement (ACK) or a negative ACK based on the determined result. For example, the decoding of the second set of PCBs may include deinterleaving the set of parity bits and deinterleaving the set of systematic bits.

FIG. 27 is a flowchart illustrating another representative procedure implemented by a RN.

Referring to FIG. 27 the representative procedure 2700 may include, at block 2710, the RN 102/180 receiving a first transmission including a first set of polar coded bits (PCBs) and a second transmission including a second set of PCBs including a set of parity bits. At block 2720, the RN 102/180 may concatenate symbols of the first and second sets of PCBs, as a concatenated stream of symbols. At block 2730, the RN 102/180 may decode the concatenated stream of symbols. At block 2740, the RN 102/180 may determine whether the first transmission and/or the second transmission are successfully received, as a determined result. At block 2750, the RN 102/180 may send an acknowledgement (ACK) or a negative ACK based on the determined result. For example, the decoding of the second set of PCBs may include deinterleaving the set of parity bits and deinterleaving the set of systematic bits.

Figure 28:
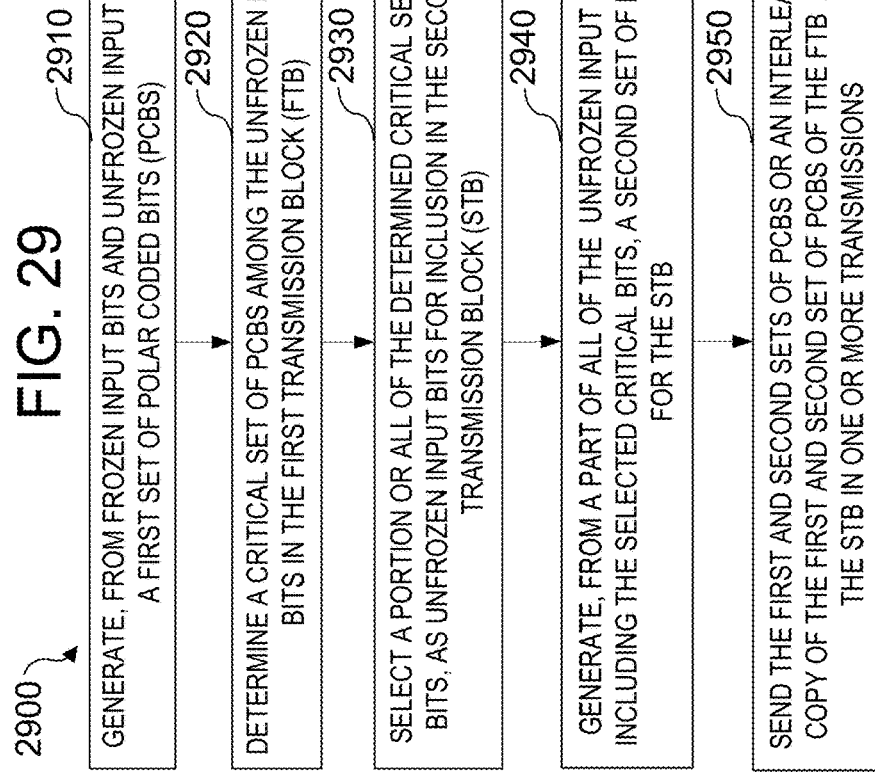
FIG. 28 is a flowchart illustrating a further representative procedure implemented by a RN.

FIG. 28 is a flowchart illustrating a further representative procedure implemented by a RN.

Referring to FIG. 28, the representative procedure 2800 may include, at block 2810, the RN 102/180 receiving a first transmission including a first set of PCBs. At block 2820, the RN 102/180 may determine whether the first transmission is successfully received, as a determined result. At block 2830, the RN may send an acknowledgement (ACK) or a negative ACK based on the determined result. At block 2840, the RN

102/180 may select one decoding operation of a plurality of decoding operations based on any of: (1) a code rate, (2) a target error rate and/or (3) a number of shortened bits in the first transmission. At block 2850, the RN 102/180 may decode, based on the determined result, the first and second sets of PCBs using the selected one of the decoding operations.

In certain representative embodiments, the TN 102/180 may combine repetitive parts of the first transmission and repetitive part of the second transmission received after the second transmission with previously received symbols in a Log-likelihood ratio (LLR) calculation.

In certain representative embodiments, the TN 102/180 may exchange a part of Log-likelihood ratio (LLR) values of the unfrozen bit in a first decoding with LLR values of the unfrozen bits in a second decoding such that the exchanging uses Belief Propagation (BP) algorithm based decoding.

Figure 29:
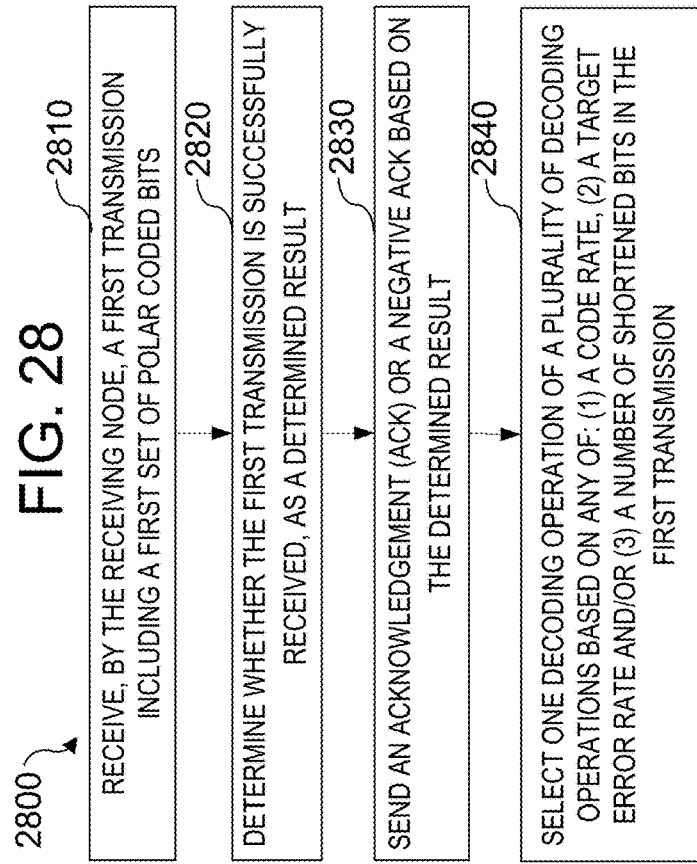
FIG. 29 is a flowchart illustrating a still further representative procedure implemented by a TN.

FIG. 29 is a flowchart illustrating a still further representative procedure implemented by a TN.

Referring to FIG. 29, the representative procedure 2900 may include, at block 2910, the TN 102/180 generating from frozen input bits and unfrozen input bits, a first set of polar coded bits (PCBs). At block 2920, the TN 102/180 may determine a critical set of PCBs among the unfrozen input bits in the first transmission block (FTB). At block 2930, the TN 102/180 may select a portion or all of the determined critical set of bits, as unfrozen input bits for inclusion in the second transmission block (STB). At block 2940, the TN 102/180 may generate, from a part of all of the unfrozen input bits including the selected critical bits, a second set of PCBs for the STB. At block 2950, the TN 102/180 may send the first and second sets of PCBs or an interleaved copy of the first and second sets of PCBs of the FTB and the STB in one or more transmissions.

In certain representative embodiments, the TN 102/180 may configure a systematic polar encoder by cascading a first non-systematic polar encoder with a second non-systematic polar encoder; may copy a portion of input bits provided to the second non-systematic polar encoder in the FTB to a portion of input bits provided to the second non-systematic polar encoder in the STB; may process the portion of the input bits provided to the second non-systematic polar encoder in the FTB, as frozen bits; and/or may process the portion of the input bits provided to the second non-systematic encoder in the STB, as unfrozen bits.

In certain representative embodiments, the RN 102/180 may concatenate and serially store, in a circular buffer 740, transmitted bits of the FTB and the STB; and/or may select TN, retransmitted bits to be sent after a second transmission from the circular buffer 740.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a Transmitting Node (TN), the method comprising:
    generating a first set of polar coded bits (PCBs) by applying a shortening operation in a polar encoding process;
    sending the first set of PCBs or an interleaved copy of the first set of PCBs in a first transmission;
    selecting one code generating operation from a plurality of code generating operations based on at least a number of shortened bits associated with the shortening operation;

storing in a circular buffer a second set of PCBs based on the first set of PCBs or based on a mother code block (MCB) in accordance with the selected code generating operation;

on condition that the first transmission was not successful, outputting, from the circular buffer, a copy of a part of the second set of PCBs for transmission;

sending the copy of the second set of PCBs in a second transmission;

determining indices associated with a set of parity bits in the MCB;

selecting, from the circular buffer based on the determined indices, the set of parity bits in the MCB for inclusion in the copy of the part of the second set of PCBs; and generating the copy of the part of the second set of PCBs including the selected set of parity bits.

2. The method of claim 1, wherein the storing in the circular buffer includes one of: (1) PCBs associated with the MCB prior to or without the shortening operation, on condition that the number of shortened bits exceeds a threshold; and (2) PCBs after the shortening operation, on condition that the number of shortened bits does not exceed the threshold.

3. The method of claim 1, further comprising:
grouping the selected set of parity bits together in a sequence;
grouping a set of systematic bits together in a sequence; and
interleaving the grouped parity bits and the grouped systematic bits for generation of the copy of the part of the second set of PCBs.

4. The method of claim 1, wherein the selecting of the one code generating operation from the plurality of code generating operations is based on the number of shortened bits associated with the shortening operation and any of: (1) a code rate, and/or (2) a target error rate.

5. A method implemented by a wireless transmit/receive unit (WTRU) or a network entity, as a transmitting node (TN), using a set of input bits, the method comprising:

determining a shortening number (SN) associated with a shortening operation for generation of a first transmission;

generating, by the TN from the set of input bits, a first set of polar coded bits (PCBs), the first set of PCBs to provide data or control information;

sending, by the TN to a receiving node (RN) in the first transmission, the first set of PCBs shortened in accordance with the SN;

generating, by the TN, based on whether the SN exceeds a threshold from: (1) a mother code block (MCB) associated with the set of input bits, a second set of PCBs or (2) a shortened polar code block associated with the set of input bits, the second set of PCBs;

sending, by the TN to the RN, the generated second set of PCBs in a second transmission; and storing, in a circular buffer based on whether the SN exceeds the threshold, one of: (1) PCBs associated with the MCB prior to or without the shortening operation; or (2) PCBs associated with the shortening operation, wherein the generating of the second set of PCBs uses the stored PCBs.

6. The method of claim 5, further comprising:
receiving, by the TN from the RN, an acknowledgment (ACK) or a negative ACK (NACK) associated with the data or the control information;

wherein:
the generating of the second set of PCBs from the MCB includes one of:
(1) on condition that the received NACK is a first received NACK associated with the data or the control information, generating prioritized parity bits from the MCB; or
(2) on condition that the received NACK is not the first received NACK:
selecting a subset of bits from the MCB; and
generating the second set of PCBs from the selected subset of bits.

7. The method of claim 5, wherein the first set of PCBs including a set of parity bits is one of: (1) the MCB or (2) the shortened polar code block.

8. The method of claim 7, further comprising:
determining, from a received message or expiry of a timer, whether the first transmission was successful; and on condition that the first transmission was not successful, determining indices associated with the set of parity bits in the MCB, wherein the generating of the second set of PCBs includes selecting, from the circular buffer, the set of parity bits in the MCB for inclusion in the second transmission based on the determined indices.

9. The method of claim 8, further comprising:
grouping the set of parity bits together in a sequence;
grouping a set of systematic bits together in a sequence; and
interleaving, by the TN, the grouped parity bits and the grouped systematic bits for transmission in the second transmission or a subsequent transmission.

10. A Transmitting Node (TN), comprising:
a processor configured to:
apply a shortening operation to generate a first set of polar coded bits (PCBs), and
select one code generating operation of a plurality of code generating operations based on at least a number of shortened bits associated with a shortened polar code block after the shortening operation; a circular buffer configured to store a second set of PCBs based on the first set of PCBs or based on a mother code block (MCB) in accordance with the selected code generating operation;
a wireless transmitter/receiver configured to send the first set of PCBs or an interleaved copy of the first set of PCBs in a first transmission;
wherein:
the TN is configured to, on condition that the first transmission was not successful, output from the circular buffer, a copy of a part of the second set of PCBs for transmission; and
the wireless transmitter/receiver is configured to send the copy of the part of the second set of PCBs in a second transmission; and,
the processor is configured to:
determine indices associated with a set of parity bits in the MCB;
select, from the circular buffer based on the determined indices, the set of parity bits in the MCB for inclusion in the copy of the part of the second set of PCBs, and
generate the copy of the part of the second set of PCBs including the selected set of parity bits.

11. The TN of claim 10, wherein the circular buffer is configured to store any of: (1) PCBs associated with the MCB prior to or without the shortening operation, on condition that the number of shortened bits exceeds a threshold; and/or (2) PCBs associated with the shortening operation, on condition that the number of shortened bits does not exceed the threshold.

12. The TN of claim 10, further comprising an interleaver, wherein:
the processor is configured to:
group the selected set of parity bits together in a sequence, and
group a set of systematic bits together in a sequence; and
the interleaver is configured to interleave the grouped parity bits and the grouped systematic bits to generate the copy of the part of the second set of PCBs.

13. The TN of claim 10, wherein the processor is configured to:
select the one code generating operation based on the number of shortened bits and any of: (1) a code rate, and/or (2) a target error rate.

14. The TN of claim 10, wherein:
the wireless transmitter/receiver is configured to receive from a receiving node, an acknowledgment (ACK) or a negative ACK (NACK) associated with data or control information of the first transmission, and
the processor is configured to select the code generating operation based on the number of shortened bits associated with the shortening operation and whether the received NACK is a first received NACK associated with the data or the control information.

15. The TN of claim 10, wherein the processor is configured to generate the second set of PCBs including prioritized parity bits from the MCB in accordance with the selected code generating operation.

16. The TN of claim 10, wherein the processor is configured to generate the second set of PCBs from: (1) a selected subset of PCBs of the MCB; or (2) the shortened polar code block.

17. The TN of claim 10, wherein the first set of PCBs including a set of parity bits is one of: (1) the MCB; or (2) the shortened polar code block.

* * * * *